(12) United States Patent
McNie et al.

(10) Patent No.: US 7,969,639 B2
(45) Date of Patent: Jun. 28, 2011

(54) OPTICAL MODULATOR

(75) Inventors: Mark Edward McNie, Bromsgrove (GB); Keith Loder Lewis, Malvern (GB); Andrew Maxwell Scott, Malvern (GB); Christopher William Slinger, Ledbury (GB); Kevin Michael Brunson, Worcester (GB); Gilbert William Smith, Malvern (GB)

(73) Assignee: QinetiQ Limited, London (GB)

( * ) Notice: Subject to any disclaimer, the term of this patent is extended or adjusted under 35 U.S.C. 154(b) by 86 days.

(21) Appl. No.: 12/278,500

(22) PCT Filed: Feb. 6, 2007

(86) PCT No.: PCT/GB2007/000414
§ 371 (c)(1),
(2), (4) Date: Aug. 6, 2008

(87) PCT Pub. No.: WO2007/091053
PCT Pub. Date: Aug. 16, 2007

(65) Prior Publication Data
US 2009/0052008 A1 Feb. 26, 2009

(30) Foreign Application Priority Data
Feb. 6, 2006 (GB) .................................. 0602384.0

(51) Int. Cl.
*G02F 1/03* (2006.01)
*G02B 26/00* (2006.01)

(52) U.S. Cl. ........ 359/260; 359/248; 359/290; 359/291; 359/321; 359/213.1; 345/85; 372/20; 372/26

(58) Field of Classification Search .......... 359/290–295, 359/298, 245, 247, 248, 213.1, 321, 260, 359/282, 286; 345/85; 372/20, 23, 39, 92, 98; 356/248, 480, 506; 257/21; 385/28, 37, 39, 50

See application file for complete search history.

(56) References Cited

U.S. PATENT DOCUMENTS

| | | | |
|---|---|---|---|
| 3,860,821 A | 1/1975 | Barrett |
| 3,961,191 A | 6/1976 | Stoner et al. |
| 4,075,483 A | 2/1978 | Tancrell et al. |
| 4,092,540 A | 5/1978 | Barrett |

(Continued)

FOREIGN PATENT DOCUMENTS
DE 25 28 641 A1 1/1976
(Continued)

OTHER PUBLICATIONS

U.S. Appl. No. 60/932,335, filed Oct. 17, 2005 in the name of David Brady.

(Continued)

*Primary Examiner* — Loha Ben
(74) *Attorney, Agent, or Firm* — Oliff & Berridge, PLC

(57) ABSTRACT

A micro-opto-electro-mechanical systems (MOEMS) electro optical modulator (2) having an electrically tuneable optical resonator comprising an asymmetric Fabry-Perot etalon incorporating a mirror (10) resiliency biased with respect to a substrate (13) and moveable in relation thereto in response to a voltage applied there-between. The optical modulator (2) is capable of modulating electromagnetic radiation having a plurality of wavelengths. The modulator is adapted to modulate the transmission of short wave infrared radiation (SWIR), medium wave infrared radiation (MWIR) and long wave infrared radiation (LWIR) and the reflection of visible radiation. A spatial optical modulator having a plurality of said MOEMS optical modulators (2). A method of addressing said spatial optical modulator.

17 Claims, 10 Drawing Sheets

U.S. PATENT DOCUMENTS

| | | | |
|---|---|---|---|
| 4,165,462 A | 8/1979 | Macovski et al. | |
| 4,209,780 A | 6/1980 | Fenimore et al. | |
| 4,954,789 A * | 9/1990 | Sampsell | 359/318 |
| 5,047,822 A * | 9/1991 | Little et al. | 359/321 |
| 5,115,335 A * | 5/1992 | Soref | 359/248 |
| 5,294,971 A | 3/1994 | Braunecker et al. | |
| 5,311,360 A | 5/1994 | Bloom et al. | |
| 5,426,312 A * | 6/1995 | Whitehead | 257/21 |
| 5,448,395 A | 9/1995 | Lopez et al. | |
| 5,488,504 A * | 1/1996 | Worchesky et al. | 359/248 |
| 5,500,761 A | 3/1996 | Goossen et al. | |
| 5,519,529 A * | 5/1996 | Ahearn et al. | 359/248 |
| 5,552,912 A * | 9/1996 | Sharp et al. | 349/117 |
| 5,579,149 A | 11/1996 | Moret et al. | |
| 5,636,001 A | 6/1997 | Collier | |
| 5,636,052 A | 6/1997 | Arney et al. | |
| 5,710,656 A | 1/1998 | Goossen | |
| 5,772,598 A | 6/1998 | Halling | |
| 5,784,189 A | 7/1998 | Bozler et al. | |
| 5,825,528 A | 10/1998 | Goossen | |
| 5,838,484 A | 11/1998 | Goossen | |
| 5,841,579 A | 11/1998 | Bloom et al. | |
| 5,870,221 A | 2/1999 | Goossen | |
| 5,943,155 A | 8/1999 | Goossen | |
| 5,949,571 A | 9/1999 | Goossen et al. | |
| 5,953,161 A | 9/1999 | Troxell et al. | |
| 5,995,251 A | 11/1999 | Hesselink et al. | |
| 6,034,807 A | 3/2000 | Little et al. | |
| 6,069,361 A | 5/2000 | Rubinstein | |
| 6,195,412 B1 | 2/2001 | Tobin, Jr. et al. | |
| 6,324,192 B1 * | 11/2001 | Tayebati | 372/20 |
| 6,329,967 B1 | 12/2001 | Little et al. | |
| 6,392,235 B1 | 5/2002 | Barrett et al. | |
| 6,396,976 B1 | 5/2002 | Little et al. | |
| 6,424,450 B1 | 7/2002 | Goossen | |
| 6,430,333 B1 | 8/2002 | Little et al. | |
| 6,467,879 B1 | 10/2002 | Kubby et al. | |
| 6,519,073 B1 | 2/2003 | Goossen | |
| 6,570,143 B1 | 5/2003 | Neil et al. | |
| 6,737,652 B2 | 5/2004 | Lanza et al. | |
| 6,819,463 B2 * | 11/2004 | Noonan | 359/245 |
| 6,819,466 B2 * | 11/2004 | Tayebati | 359/260 |
| 6,856,449 B2 | 2/2005 | Winkler et al. | |
| 7,006,132 B2 | 2/2006 | Pereira et al. | |
| 7,031,577 B2 * | 4/2006 | Painter et al. | 385/50 |
| 7,235,773 B1 | 6/2007 | Newman | |
| 7,251,396 B2 * | 7/2007 | Larochelle et al. | 385/37 |
| 7,415,049 B2 * | 8/2008 | Flanders et al. | 372/20 |
| 2002/0075990 A1 | 6/2002 | Lanza et al. | |
| 2003/0058520 A1 | 3/2003 | Yu et al. | |
| 2003/0122955 A1 | 7/2003 | Neidrich | |
| 2003/0164814 A1 | 9/2003 | Starkweather et al. | |
| 2003/0191394 A1 | 10/2003 | Simon et al. | |
| 2004/0008397 A1 | 1/2004 | Noonan | |
| 2004/0046123 A1 | 3/2004 | Dausch | |
| 2005/0057793 A1 | 3/2005 | Starkweather et al. | |
| 2005/0248827 A1 | 11/2005 | Starkweather et al. | |
| 2006/0038705 A1 | 2/2006 | Brady et al. | |
| 2006/0157640 A1 | 7/2006 | Perlman et al. | |
| 2007/0013999 A1 | 1/2007 | Marks et al. | |
| 2007/0091051 A1 | 4/2007 | Shen | |
| 2008/0128625 A1 | 6/2008 | Lamadie et al. | |
| 2008/0151391 A1 | 6/2008 | Zalevsky et al. | |
| 2008/0259354 A1 | 10/2008 | Gharib et al. | |
| 2008/0285034 A1 | 11/2008 | Gharib et al. | |
| 2009/0008565 A1 | 1/2009 | Gottesman | |
| 2009/0020714 A1 | 1/2009 | Slinger | |
| 2009/0022410 A1 | 1/2009 | Haskell | |
| 2009/0090868 A1 | 4/2009 | Payne | |
| 2009/0167922 A1 | 7/2009 | Perlman et al. | |

FOREIGN PATENT DOCUMENTS

| | | |
|---|---|---|
| EP | 0 318 249 A2 | 5/1989 |
| EP | 0 663 763 A2 | 7/1995 |
| EP | 1 341 025 A1 | 9/2003 |
| EP | 1 491 958 A2 | 12/2004 |
| EP | 1 494 046 A1 | 1/2005 |
| EP | 1 627 526 | 2/2006 |
| GB | 1 449 636 | 9/1976 |
| GB | 2314664 | 1/1998 |
| GB | 2 350 472 | 11/2000 |
| GB | 2 414 881 A | 12/2005 |
| GB | 2 418 028 A | 3/2006 |
| GB | 2 434 935 A | 8/2007 |
| JP | A-55-146411 | 11/1980 |
| JP | A-04-005620 | 1/1992 |
| JP | A-09-113819 | 5/1997 |
| JP | A-2003-4441 | 1/2003 |
| WO | WO 91/12502 A1 | 8/1991 |
| WO | WO 94/18582 A1 | 8/1994 |
| WO | WO 96/24032 A1 | 8/1996 |
| WO | WO 97/26557 | 7/1997 |
| WO | WO 98/46007 A1 | 10/1998 |
| WO | WO 00/17810 A1 | 3/2000 |
| WO | WO 00/45608 A1 | 8/2000 |
| WO | WO 02/44788 A1 | 6/2002 |
| WO | WO 02/056055 A2 | 7/2002 |
| WO | WO 02/056061 A2 | 7/2002 |
| WO | WO 03/017000 A1 | 2/2003 |
| WO | WO 2004/102958 A1 | 11/2004 |
| WO | WO 2006/125975 | 11/2006 |
| WO | WO 2007/045875 A1 | 4/2007 |
| WO | WO 2007/047732 A2 | 4/2007 |
| WO | WO 2007/054769 A2 | 5/2007 |
| WO | WO 2007/091051 A1 | 8/2007 |
| WO | WO 2007/121417 A2 | 10/2007 |
| WO | WO 2008/108840 A1 | 9/2008 |
| WO | WO 2008/128625 A2 | 10/2008 |
| WO | WO 2008/142543 A1 | 11/2008 |

OTHER PUBLICATIONS

Mar. 29, 2010 Office Action issued in U.S. Appl. No. 12/278,470.
Bertero et al., "Image Restoration Methods for the Large Binocular Telescope (LBT)," Astronomy and Astrophysics, May 30, 2000, pp. 1-15.
Cannon et al., "Coded Aperture Imaging: Many Holes Make Light Work," Optical Engineering, May/Jun. 1980, vol. 19, No. 3, pp. 283-289, (XP-001092857).
De Villiers et al., "Sub-Pixel Super-Resolution by Decoding Frames from a Reconfigurable Coded-Aperture Camera: Theory and Experimental Verification," Proc. of SPIE, 2009, vol. 7468, pp. 746806-1 to 746806-9, (XP-002558345).
Gutin et al., "Agile, Detecting and Discriminating, infrared Electooptical System (ADDIOS) Application to Coded Aperture Imaging and Non-Imaging Sensor Systems," Proc. of SPIE, 2007, vol. 6714, pp. 671406-1 to 671406-12, (XP-002558346).
Mohan et al., "Sensing Increased Image Resolution Using Aperture Masks," CVPR, 2008, pp. 1-8, (XP-31297391).
Slinger et al., "Coded Aperture Systems as Nonconventional, Lensless Imagers for the Visible and Infrared," Proc. of SPIE, 2007, vol. 6737, pp. 67370D-1 to 67370D-10, (XP-002558347).
Rocchia et al., "A Multiplex Imaging Spectrometer for Low Energy X-Ray Astronomy," Astrophysics and Space Science, Oct. 1983, vol. 96, No. 2, pp. 361-374.
Grindlay et al., "Optimizing Wide-Field Coded Aperture Imaging: Radial Mask Holes and Scanning," Proc. of SPIE, 2004, vol. 5168, No. 1, pp. 402-410, San Diego, CA, USA, Aug. 4-7, 2003.
Dec. 23, 2009 International Search Report issued in corresponding International Application No. PCT/GB2009/001870.
Mar. 5, 2010 International Search Report issued in corresponding International Application No. PCT/GB2009/002780.
Mar. 19, 2009 Office Action issued in corresponding Application No. GB0822281.2.
Feb. 23, 2010 Office Action issued in U.S. Appl. No. 12/278,528.
Mar. 11, 2010 Office Action issued in U.S. Appl. No. 12/278,521.
Nov. 18, 2009 Office Action issued in U.S. Appl. No. 11/920,345.
May 7, 2010 Office Action issued in U.S. Appl. No. 11/920,345.
Schaich et al., "Computer Vision for Detecting and Quantifying Gamma-Ray Sources in Coded-Aperture Images," Record of the Asilomar Conference on Signals, Systems and Computers, Oct. 30, 1994, vol. 1, Conf. 28, pp. 741-748, (XP 000533631).

Casasent et al., "Real-time deformation invariant optical pattern recognition using coordinate transformations," *Applied Optics*, Mar. 1, 1987, pp. 938-942, vol. 26, No. 5, Optical Society of America, (XP 000601745).

Gmar et al., "Development of Coded-Aperture Imaging With a Compact Gamma Camera," *IEEE Transactions on Nuclear Science*, Aug. 2004, pp. 1682-1687, vol. 51, No. 4, IEEE, (XP 002366988).

Busboom et al., "Coded aperture imaging with multiple measurements," *J. Opt. Soc. Am. A*, May 1997, pp. 1058-1065, vol. 14, No. 5, Optical Society of America, (XP 002431989).

Mertz et al., "Fresnel Transformations of Images," *Proceedings of the Conference on Optical Instruments and Techniques*, London 1961, Ed. K.J. Habel, 1961, pp. 305-312, (XP 002432814).

Graziani et al., "Localization of GRBs by Bayesian Analysis of Data from the HETE WXM," AIP Conference Proceedings AIP USA, 2003, No. 662, (XP 002467862).

Graziani et al., "Determination of X-Ray Transient Source Positions By Bayesian Analysis of Coded Aperture Data," Oct. 8, 1997, pp. 1-6, (XP 002467863).

Gopinathan et al., "Coded apertures for efficient pyroelectric motion tracking," *Optics Express*, Sep. 8, 2003, vol. 11, No. 18, pp. 2142-2152, (XP 002467864).

Accorsi et al., "High-Sensitivity Dynamic Coded Aperture Imaging," *2003 IEEE Nuclear Science Symposium Conference Record*, vol. 5 of 5, Oct. 19, 2003, pp. 1833-1837, vol. 13, IEEE.

Brown, "Multiplex imaging with multiple-pinhole cameras," *Journal of Applied Physics.*, Apr. 1974, pp. 1806-1811, vol. 45, No. 4, American Institute of Physics.

Monnelly et al., "HETE Soft X-ray Camera Imaging: Calibration, Performance, and Sensitivity," *AIP Conference Proc.*, 2003, pp. 49-55, American Institute of Physics.

Wood et al., "Hybrid optics in dual waveband infrared systems," *Proc of. SPIE*, 1998, pp. 602-613, vol. 3482.

Fish et al., "Scanning singular-value-decomposition method for restoration of images with space-variant blur," *J. Opt. Soc. Am. A*, Mar. 1996, pp. 464-469, vol. 13, No. 3, Optical Society of America.

Moseley et al., "Microshutters Arrays for the JWST Near Infrared Spectrograph," *Proceedings SPIE, International Society for Optical Engineering*, 2004, vol. 5487, Part 2, pp. 645-652.

Kutyrev et al., "Programmable Microshutter Arrays for the JWST NIRSpec: Optical Performance," *IEEE Journal of Selected Topics in Quantum Electronics*, May/Jun. 2004, vol. 10, No. 3, pp. 652-661.

De Villiers et al.; "Positive solutions to linear inverse problems," *Inverse Problems*, 1999, pp. 615-635, vol. 15, IOP Publishing Ltd.

U.S. Appl. No. 60/726,655, filed on Oct. 17, 2005 in the name of David Brady.

U.S. Appl. No. 12/278,528, filed Aug. 6, 2008 in the name of Douglas Payne.

U.S. Appl. No. 12/278,515, filed Aug. 6, 2008 in the name of Philip Haskell.

U.S. Appl. No. 12/278,470, filed Aug. 6, 2008 in the name of Christopher Slinger.

U.S. Appl. No. 12/278,521, filed Aug. 6, 2008 in the name of Christopher Slinger.

U.S. Appl. No. 12/278,524, filed Aug. 6, 2008 in the name of Christopher Slinger et al.

U.S. Appl. No. 12/373,946, filed Jan. 15, 2009 in the name of Malcolm Strens.

Fenimore et al.; "Coded aperture imaging with uniformly redundant arrays"; *Applied Optics*; Feb. 1, 1978; pp. 337-347; vol. 17, No. 3; Optical Society of America.

Cannon et al.; "Tomographical imaging using uniformly redundant arrays"; *Applied Optics*; Apr. 1, 1979; pp. 1052-1057; vol. 18, No. 7; Optical Society of America.

Goosen et al.; "Silicon Modulator Based on Mechanically-Active Anti-Reflection Layer with 1 Mbit/sec Capability for Fiber-in-the-loop Applications"; *IEEE: Photonics Technology Letters*; Sep. 1994; pp. 1119-1121; vol. 6, No. 9; IEEE.

Lewis et al.; "Micromachined Modulator Arrays for Use in Free-Space Optical Communcations Systems"; *Advanced Free-Space Optical Communications Techniques and Technologies, Proceedings of SPIE*; 1994; pp. 24-30; vol. 5614.

Tam et al.; "Spatial-light-modulator-based electro-optical imaging system"; *Applied Optics*; Feb. 10, 1992; pp. 578-580; vol. 31, No. 5; Optical Society of America.

Sun et al.; "Method for reduction of background artifacts of images in scanning holography with a Fresnel-zone-plate coded aperture"; *Applied Optics*; Jul. 20, 2004; pp. 4214-4218; vol. 43, No. 21; Optical Society of America.

International Search Report for PCT/GB2006/001890 mailed Aug. 28, 2006.

GB Search Reports for Application No. 0510470.8 dated Aug. 16, 2005, Nov. 8, 2005 and Nov. 10, 2005.

Aug. 31, 2010 Office Action issued in U.S. Appl. No. 12/278,528.

Ivanov, O.P., "Control and image decoding software for portable gamma-ray imaging system with coded aperture", Oct. 1999, Nuclear Science Symposium 1999. Conference Record. 1999 IEEE, vol. 1, pp. 459-463.

Aug. 26, 2009 Office Action issued in U.S. Appl. No. 12/278,528.

Jan. 12, 2011 Office Action issued in U.S. Appl. No. 12/278,528.

M. Bertero & P. Boccacci, "Introduction to Inverse Problems in Imaging," Institute of Physics Publishing, 1998, p. 106-113; 174-183; 288-294.

Sep. 30, 2010 Office Action issued in U.S. Appl. No. 12/278,470.

Sep. 14, 2010 Office Action issued in Japanese Patent Application No. 2008-512909 (translation).

Feb. 25, 2011 Office Action issued in U.S. Appl. No. 12/278,470.

Meng et al. "A Gamma Ray Imager Using Clustered Non-Redundant Array Coded Aperture," 2003 IEEE Nuclear Science Symposium Conference Record, vol. 2 (Oct. 2003), pp. 763-766.

* cited by examiner

Transmittance (%) vs Wavelength (μm)

Transmittance (%) vs Wavelength (μm)

→ R1  ■ R2  ▲ C1  ✳ C2

◆ P22  ■ P12  ▲ P21  ✳ P11

OPTICAL MODULATOR

FIELD OF THE INVENTION AND RELATED ART

The present invention relates to an optical modulator and a method of controlling the same. The invention relates specifically, but not exclusively, to a micro opto-electro-mechanical systems (MOEMS) spatial optical modulator for use in an imaging system.

Spatial optical modulators are of interest for a variety of imaging applications including scientific instruments and commercial products.

By way of background to the present invention, MOEMS optical modulators are known which utilise optical interference effects to control the intensity and/or phase of a beam of light. For example, Lewis et al., SPIE-5614 (1994), pp. 24-30 describes an optical modulator structure based on a MOEMS device with a tuneable gap that acts as a resonant optical cavity (silicon-air-silicon Fabry-Perot etalon). The device described in Lewis et al. does however differ from most MOEMS optical modulator structures in that it may act in transmission as well as reflection.

Goossen et al, IEEE Phot. Tech. Lett. 6 (1994), pp. 1119-1121 describes an optical modulator, operated in reflective mode, based on a resonant Fabry-Perot cavity incorporating a tuneable cavity below a moveable membrane. In the device referred to in Goossen et al., the membrane is supported by arms above an air gap and is moveable by means of electrostatic force resulting from a bias voltage applied between an electrode placed around the circumference of the membrane and an underlying substrate. When the membrane is brought into close proximity with the underlying substrate, an antireflection condition exists and so the reflected signal is diminished. In transmission the contrast between the open and closed states is very low and the design would not be suitable as a spatial light modulator for use in the infra-red spectral region. Whilst the modulator described in Goossen may be usefully employed in fibre-optic communications applications, such a structure is difficult to scale up into a two-dimensional arrays having fine pitch geometries (10 µm-50 µm) because its fill factor would be unacceptably low. In addition, the stresses in the materials used within the modulator are such that a more compact support structure could not be realised without significantly distorting the moveable membrane. Further, the device referred to in Goossen et al. is susceptible to distortion due to differential thermal coefficients of expansion of the materials used therein (metal over nitride structure). Such distortion would compromise the optical performance of the device since the resonant cavity would be ill-defined.

The electrode being limited to the periphery of the membrane to maximise fill factor means only a small proportion of the area is used to drive the device electrostatically. Thus high voltages are required to modulate the device. Similarly, the metal being above the membrane, increases the inter-electrode gap and reduces the resulting force unless a higher drive voltage is applied. The finite size of the upper electrode required on the device and associated drive voltages makes this device unsuitable for scaling to small pixel sizes (15-50 µm) required for large area (two dimensional) arrays with high pixel counts.

U.S. Pat. No. 5,636,052 describes a reflective display comprising a two-dimensional spatial optical modulator having an array of MOEMS optical modulators. Each modulator within the array comprising a moveable membrane suspended over a substrate. Each optical modulator employs optical interference effects between the moveable membrane and the underlying substrate which causes the modulator to either substantially reflect or absorb an optical signal. The display operates exclusively in reflection. The optical modulators within the array are individually addressable via associated drive electronics using a row-column addressing scheme. An active row-column addressing matrix is employed with each modulator having at least one address transistor associated therewith. The drive electronics may be fabricated on the same substrate as the spatial optical modulator contiguous to each individual modulator. As will be appreciated by the skilled reader, this arrangement facilitates interfacing of data signals with the spatial optical modulator but may reduce the fill-factor of the array. Additionally, the high temperature micro-electro-mechanical (MEMS) processing steps used to fabricate the modulator membrane can degrade the characteristics of the transistors within the drive electronics. Furthermore, fabricating the drive electronics in the substrate interferes with the optical properties of the substrate, thereby restricting the spatial optical modulator to reflective operation only.

The majority of MEMS array addressing schemes are based on buried (in-pixel) addressing electronics. Whilst the hysteretic characteristic of electrostatic devices is widely known, addressing schemes for MEMS devices based on this phenomenon are not. One exception may be found in EP 1 341 025, however, such addressing schemes have not hitherto been employed for MOEMS spatial optical modulators of the present invention. EP 1 341 025 describes a reflective MEMS optical display system which uses activation electrodes to operate a plurality of MEMS reflectors and separate storage electrodes to latch the MEMS reflectors into preferred positions. In contrast to the present invention, the device described EP 1 341 025 only operates in reflection since the electrodes therein are not optically transmissive. Accordingly, the drive electrodes in EP 1 341 025 do not form part of the optical structure of the device. Finally, the addressing scheme discussed in EP 1 341 025 is unable to reset individual reflectors within the display system.

It is an object of the invention to provide an alternative MOEMS spatial optical modulator, which mitigates at least some of the disadvantages of the devices described above. It is a further object of the invention to provide a passive method of controlling a MOEMS spatial optical modulator that does not require in-pixel electronics. Another objective of the present invention is to realise a MOEMS modulator that acts as a micro-shutter array.

SUMMARY OF THE INVENTION

According to a first aspect of the present invention there is now proposed a micro-opto-electro-mechanical systems (MOEMS) optical modulator having an optical resonator comprising an asymmetric Fabry-Perot etalon incorporating a mirror resiliently biased with respect to a substrate and moveable in relation thereto in response to a voltage applied there-between.

Preferably, the optical modulator is capable of modulating electromagnetic radiation having a plurality of wavelengths and/or angles of incidence. Alternatively, the optical modulator is capable of modulating electromagnetic radiation having a single wavelength.

By way of explanation, in a conventional Fabry-Perot etalon, each mirror usually comprises a dielectric stack of material of contrasting refractive index, with each layer approximately a quarter optical wavelength in thickness. The resonant cavity formed by the air gap between the mirrors is conventionally a multiple of a half optical wavelength (at the design wavelength) in thickness. Thus by shifting the moveable mirror from the case where it is a half-wavelength to a quarter wavelength in thickness it is possible to achieve two contrasting optical states, since in the latter case the entire stack is in essence a broad-band reflector. These two states are denoted open and closed respectively. The problem with such a design is that the spectral response of the open state is relatively narrow and such a device would be unsuitable as a broadband light modulator across a wide spectral range ($0.75 < w_0 < 1.2$) where $w_0$ is the design wavelength. In the present approach, the cavity thickness is reduced to a level close to zero, so that the ensuing interference stack becomes in essence a broad-band transmission filter.

In a preferred embodiment, the optical modulator is adapted to modulate transmission of infrared radiation and, more preferably, of at least one of the short wave infrared (SWIR) radiation (0.8-2.5 µm), medium wave infrared (MWIR) radiation (3-5 µm) and long wave-infrared (LWIR) radiation (8-14 µm) atmospheric windows.

Conveniently, the optical modulator substrate is substantially transmissive to SWIR, MWIR and LWIR radiation. This characteristic refers to the transmission properties of a substrate layer in the optical modulator before the fabrication of the optical resonator thereon.

Advantageously, the modulator is substantially transmissive to MWIR radiation in an optically open state and substantially non-transmissive to MWIR radiation in an optically closed state.

Preferably the optical modulator has a maximum transmittance greater than 40%, preferably greater than 50%, even more preferably greater than 60%, advantageously greater than 70%, even more advantageously greater than 80%, optimally greater than 95% in an optically open state and a minimum transmittance of less than 5%, preferably less than 4%, even more preferably less than 3%, advantageously less than 2%, even more advantageously lass than 1% in an optically closed state for MWIR radiation.

Conveniently, the optical modulator has a multilayer stack comprising the following plurality of contiguous layers; silicon moveable mirror layer, air gap, silicon layer, a first dielectric layer, and a silicon layer. The first dielectric layer may comprise one of silicon dioxide, silicon nitride, silicon oxynitride, or a gas, for example air or nitrogen.

Alternatively, the optical modulator may have a multilayer stack comprising the following plurality of contiguous layers; silicon moveable mirror layer, air gap, a second dielectric layer, silicon layer, a first dielectric layer, and a silicon layer. In this case, the second dielectric layer may comprise one of silicon dioxide, silicon oxynitride and silicon nitride.

In another preferred embodiment, the optical modulator is adapted to modulate reflectively visible radiation.

Preferably, the mirror is moveable within the asymmetric Fabry-Perot etalon between a substantially stable first position distal to the substrate and a substantially stable second position proximate the substrate.

Conveniently, the mirror is adapted to respond to applied voltage to move non-linearly between the first and second positions. Without limitation, the term non-linear used herein shall refer to the positional response of the mirror as a function of the voltage applied to the optical modulator rather than the velocity with which the mirror moves or the acceleration thereof.

Advantageously, the mirror is adapted to move from the first position upon application of a force thereto having a magnitude which exceeds a first threshold and is adapted to move from the second position upon reduction of the magnitude of the applied force below a second threshold, the two thresholds being arranged to be substantially different.

Preferably, the force is the resultant of an electrostatic attractive force having a magnitude substantially proportional to the square of the applied voltage and a mechanical restoring force having a magnitude substantially proportional to the mirror displacement. Alternatively, or in addition, the spring can be designed to be a non-linear component.

Even more preferably, the mirror has a positional response which exhibits hysteresis.

According to a second aspect of the present invention there is now proposed a spatial optical modulator comprising a two-dimensional array of optical modulators according to the first aspect of the invention.

In a preferred embodiment, the spatial optical modulator has a first layer of electrodes and second layer of electrodes, and wherein the optical modulators are arranged in an array with each modulator having an electrode in the first layer and an electrode in the second layer.

Conveniently, the spatial optical modulator has a plurality of row electrodes and plurality of column electrodes and wherein the optical modulators are addressable individually using a passive matrix row-column addressing scheme. Such a passive addressing scheme does not require a semiconductor device (transistor etc.) to switch each optical modulator within the spatial optical modulator. In the interests of clarity a row electrode includes all the moveable mirrors within the optical modulators of said row, whereas a column electrode includes all the fixed plate electrodes within the optical modulators of said column.

Preferably, the optical resonator within each of the optical modulators comprises at least one of the first and second layer of electrodes.

Even more preferably, at least one of the first and second layer of electrodes is substantially transmissive to incident radiation.

Preferably, the optical modulators are arranged regularly in the array with a pitch (measured between the same points on adjacent modulators) in the range 5-200 µm, preferably in the range 20-50 µm, optimally 30 µm pitch.

Conveniently, at least one of the optical modulators within the spatial optical modulator is apodized. The at least one apodized optical modulator may comprise a profiled mirror.

Advantageously, the spatial optical modulator includes an array having a plurality of micro-lenses arranged in optical communication with the array of optical modulators therein. Preferably, each micro-lens within the micro-lens array cooperates with an optical modulator within the spatial optical modulator to focus electromagnetic radiation thereon.

According to a third aspect of the present invention there is now proposed a method of addressing a spatial optical modulator comprising a plurality of row electrodes and a plurality of column electrodes having a plurality of bistable MOEMS optical modulators arranged in an array with each optical modulator in the array disposed at an intersection between a row electrode and a column electrode, the method comprising the steps of:

(i) applying a column drive voltage to each column electrode, (ii) applying a row drive voltage to each row electrode, whereby the optical modulator at each intersection is operable in response to the potential difference between the column drive voltage and the row drive voltage at said intersection.

A key feature of the addressing scheme is that the whole row can be set in parallel when a given column is enabled. In practice, columns are enabled sequentially, all the rows being set in parallel for each given column.

Preferably, the method comprises setting an optical modulator to a latched position incorporating the steps of:
(i) arranging the column drive voltage applied to all column electrodes to be equal to a hold voltage reference $V_{ref}$,
(ii) increasing the column drive voltage applied to the column electrode corresponding with the modulator to be set by a set voltage $V_{set}$, wherein $V_{ref}+V_{set}$ is less than a latch voltage $V_{pi}$ required to latch the optical modulator,
(iii) arranging the row drive voltage applied to the row electrode corresponding with the modulator to be set to be equal to a row-set voltage $-V_{row-set}$, wherein the potential difference $V_{ref}+V_{set}+V_{row-set}$ is greater than the latch voltage $V_{pi}$,
(iv) removing the row drive voltage from the row electrode corresponding with the modulator to be set, and
(v) reducing the column drive voltage applied to the column electrode corresponding with the modulator to be set by the set voltage $V_{set}$ back to $V_{ref}$.

Preferably, the method comprises resetting an optical modulator from a latched position comprising the steps of:
(i) arranging the column drive voltage applied to all column electrodes except the column corresponding with the modulator to be reset to be equal to a hold voltage reference $V_{ref}$ plus a set voltage $V_{set}$, wherein $V_{ref}+V_{set}$ is less than a latch voltage $V_{pi}$ required to latch the optical modulator, the column corresponding with the modulator to be reset remains at $V_{ref}$.
(ii) arranging the row drive voltage applied to the row electrode corresponding with the modulator to be reset to be equal to a row-reset voltage $+V_{reset}$, wherein the potential difference $V_{ref}-V_{reset}$ is less than a release voltage $V_{po}$ required to release the optical modulator,
(iii) removing the row drive voltage from the row electrode corresponding with the modulator to be reset, and
(iv) reducing the column drive voltage applied to the column electrode corresponding with the modulator to be set by the reset voltage $V_{reset}$ back to $V_{ref}$.

In the interests of clarity, the foregoing steps of setting and resetting an optical modulator to and from a latched position enable an individual optical modulator on a particular row to be set without changing the state of any other optical modulators on that row.

Preferably, the method comprises setting all the optical modulators within the array to a latched position comprising the steps of:
(i) arranging the column drive voltage applied to all column electrodes to be equal to a hold voltage reference $V_{ref}$ plus a set voltage $V_{set}$, wherein $V_{ref}+V_{set}$ is less than a latch voltage $V_{pi}$ required to latch the optical modulator and greater than a release voltage $V_{po}$,
(ii) arranging the row drive voltage applied to all row electrodes to be equal to a row-set voltage $-V_{row-set}$, wherein the potential difference $V_{ref}+V_{set}+V_{row-set}$ is greater than the latch voltage $V_{pi}$,
(iii) removing the row drive voltage from the row electrode corresponding with the modulator to be set, and
(iv) reducing the column drive voltage applied to the column electrode corresponding with the modulator to be set by the set voltage $V_{set}$ back to $V_{ref}$.

Preferably, the method comprises resetting all optical modulators within the array from a latched position comprising the step of:
(i) arranging the column drive voltage applied to all column electrodes to be substantially zero.

The skilled person will realise that sub-groups of optical modulators within the array can be reset in a similar manner by addressing sub-groups of column electrodes in order to control peak current.

According to a fourth aspect of the present invention, there is now proposed an array of MOEMS modulators for an adaptive coded aperture imaging (ACAI) system comprising an aperture mask having at least one spatial optical modulator according to the second object of the invention arranged so as to modulate electromagnetic radiation incident on a detector array.

BRIEF DESCRIPTION OF THE DRAWINGS

The invention will now be described, by example only, with reference to the accompanying drawings.

FIG. 4a shows transmittance against MWIR waveband for the optical modulator when the micro-mirror is in its upper equilibrium position and in its lower position at normal incidence. FIG. 4b shows transmittance against MWIR waveband for the optical modulator when the micro-mirror is in its upper equilibrium position and in its lower position for incident angles of 0 degree and 50 degrees. FIG. 4c shows transmittance against angle of incidence by polarisation.

FIG. 9 shows predicted performance characteristics for MOEMS optical modulators according to the present invention. These show the general trends for rectilinear pixels of the form of FIG. 1. Specifically.

Referring now to the drawings wherein like reference numerals identify corresponding or similar elements throughout the several views, FIG. 1 shows a schematic cross-sectional representation of large area MOEMS optical modulator as described in our co-pending UK patent application GB 0521251, the content of which is hereby incorporated by reference thereto.

Figure 1A:
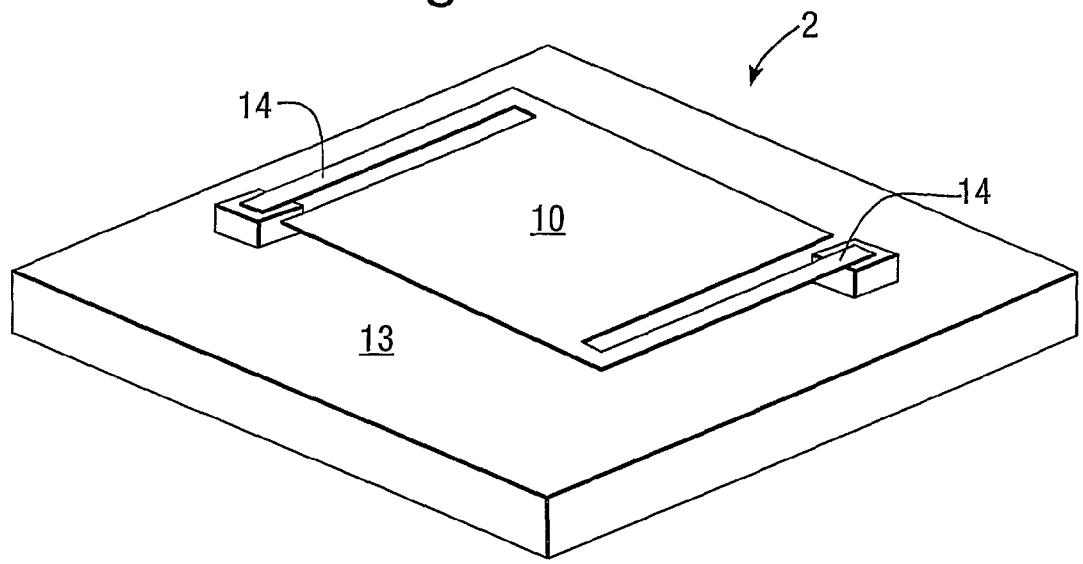
FIG. 1a shows a schematic perspective representation of a MOEMS optical modulator having two support springs.

By way of a brief explanation, the modulator described in GB 0521251 utilises optical interference effects to control the intensity and/or phase of a beam (or beams) of light and is based on a single MOEMS optical modulator or an array of MOEMS optical modulators in which one or more moveable micro-mirrors are suspended above a substrate. This arrangement may be used in transmission for wavelengths where the substrate (for example silicon) is optically transmissive, and may be used in reflection for a substantially larger range of wavelengths.

An individual optical modulator 2 comprises a moveable suspended layer 10, hereinafter referred to as a micro-mirror 10 which is suspended above a substrate 13 by a distance of between a fraction of a micron and a few microns. The micro-mirror is supported by springs 14, so that when a voltage is applied between the substrate 13 and the micro-mirror 10, electrostatic forces will pull the micro-mirror 10 from an equilibrium position towards the substrate 13.

The micro-mirror 10 may be any shape in plan form but is required to be flat and parallel to the substrate 13.

When light is directed onto this device, some of the light will be reflected and some will be transmitted to the substrate 13 and out the other side (for the case of wavelengths such that the substrate is transparent). Light reflected and transmitted by the suspended mirror 10 will interfere with light reflected and transmitted by the substrate 13, and the actual transmission and reflection of the device 2 will vary between a high and a low value depending on the angle of incidence of the light upon the device, on the spacing between the suspended mirror 10 and the substrate 13, and on other pre-determined characteristics of the system such as the thickness of the suspended micro-mirror 10, the refractive index of the material from which the micro-mirror 10 is made, and the wavelength of the incident light.

As the spacing between the micro-mirror 10 and the substrate 13 is adjusted, the transmission varies between a high and low value, providing a means of modulation of the incident light. The modulation can work in transmission or reflection modes. It is noted that the micro-mirror 10 is typically a fraction of a micron thick and will be semi-transparent even in the visible region where silicon is highly absorbing, so a modulator made from silicon can be used in reflection for the visible band. Additionally, the micro-mirror may be coated to act as an even better reflector in the visible region.

The transmission and reflection properties of the optical modulator 2 can be described by using the known formulae for transmission and reflection by a Fabry-Perot etalon. It is noted that the reflected and transmitted light experiences a phase shift as well as a change in amplitude. This can also be used in a device which communicates by modulating the phase of a beam of light.

The micro-mirrors 10 each have two stable positions in which one can be confident of ensuring the mirror 10 is located when being controlled. The first of these is an 'equilibrium position' in which the micro-mirror 10 is suspended at rest above the substrate 13 when no voltage is applied between the mirror 10 and the substrate 13, and there is no extension of the support springs 14. The second is the 'pull-down position' in which the micro-mirror 10 is pulled firmly down towards the substrate 13 when the voltage applied to the substrate 13 exceeds a certain value. Insulating stops 22 may be provided between the substrate 13 and the micro-mirror 10 so that when the voltage exceeds a certain value the mirror 10 is pulled hard against the stops 22 but cannot be pulled any further towards the substrate 13. These pull-down stops 22 thereby prevent undesirable electrical contact between the micro-mirror 10 and the substrate 13, since electrical contract would lead to a short circuit and electrical damage.

A cross-sectional view of the MOEMS optical modulator 2 discussed above is shown in FIG. 2. The MOEMS optical modulator 2 comprises a simple structure having an etalon comprising a polysilicon-air-silicon configuration. The optical modulator 2 may be fabricated on the silicon substrate 13 using only four deposition steps (silicon nitride layer 18, a polysilicon layer to produce the micro-mirror 10 and the supporting springs 14, and two phosphorous-doped silicon oxide layers which are subsequently removed from the device, the removal of the lower of the phosphorous-doped silicon oxide layers providing an air gap within the Fabry-Perot etalon). Accordingly, the simple structure results in a low cost device. Further optional layers may be included, such as an additional fixed polysilicon layer 16 as an improved etch stop and a metal layer 20 to reduce track resistance to control RC delays as the array size grows.

The micro-mirrors 10 described above may be produced as an array with an extended area covered by a tiling of closely packed optical modulators 2, in which case it becomes a spatial optical modulator. The stress is low and so a suspension of the form shown in FIG. 2 may be employed and tessellated to make a large area array. This form of design has springs 14 on two opposite or all four sides of a central substantially square or rectangular mirror plate. It represents a good compromise between plate flatness on displacement and fill factor (for good optical performance), acceptable speed and drive voltage (electromechanical performance), and scalability to large area coverage. The device utilises the substrate 13 as a global electrode and so all the optical modulators 2 are driven in parallel. Although described above in terms of a square or rectangular configuration, the mirror plate 10 (and associated two-dimensional array) may take other shapes, e.g. circular, hexagonal etc. Similarly, the springs 14 are not limited to a rectilinear configuration but could be curved. They could be also positioned relative to the mirror to facilitate connectivity and fill factor within the associated two dimensional array.

Using this approach with a MOEMS optical modulator has demonstrated data rates in excess of 200 kbps with a contrast ratio in excess of 7:1 (50:1 double pass) at 24V, at 1.55 μm.

Hitherto, the MOEMS optical modulator 2 described above has been used in a transmissive mode of operation at a single wavelength (1.55 μm) in the SWIR. A low-finesse optical cavity has been employed to provide wide angle operation.

Figure 3A:
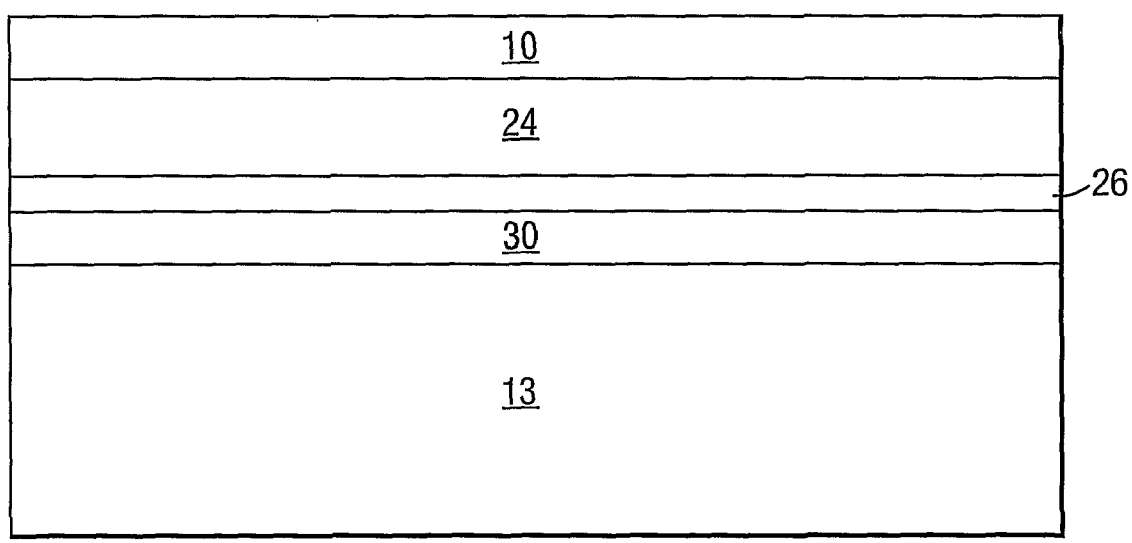
FIG. 3a illustrates a cross-sectional view of a MOEMS optical modulator according to the present invention comprising an asymmetric Fabry-Perot etalon having a tuneable cavity.

Referring now to FIG. 3a, a cross-sectional view of a MOEMS optical modulator according to the present invention comprises an asymmetric Fabry-Perot etalon having moveable mirror over a tuneable cavity. In this embodiment of the invention, the asymmetric etalon comprises a polysilicon-air-polysilicon-oxide-silicon configuration.

The MOEMS optical modulator shown in FIG. 3a comprises a silicon substrate 13 upon which is fabricated a layer 30 of silicon oxide, followed by a fixed polysilicon layer 26. The fixed polysilicon layer 26 provides the fixed electrode which is separated from the moveable micro-mirror 10 by air gap 24. In this embodiment of the invention, the etalon comprises a polysilicon-air-polysilicon-oxide-silicon configuration.

Figure 3B:
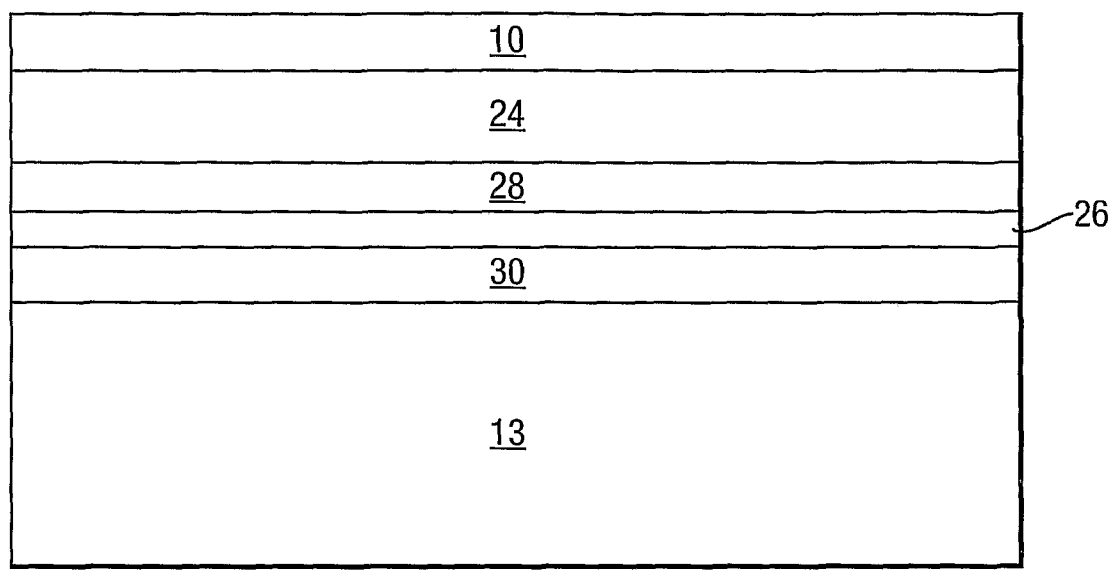
FIG. 3b shows a cross-sectional view of a MOEMS optical modulator having an asymmetric Fabry-Perot etalon of an alternative embodiment.

In an alternative embodiment shown schematically in FIG. 3b, a dielectric layer 28 is provided on top of the fixed polysilicon layer 26. In this embodiment of the invention, the etalon comprises an asymmetric polysilicon-air-dielectric-polysilicon-dielectric-silicon configuration. The upper polysilicon-air layers provide the tuneable etalon in combination with the fixed dielectric layer 28, the polysilicon layer 26, the dielectric layer 30 and the silicon substrate 13. The dielectric layer 28 preferably comprises silicon oxide, silicon oxy-nitride or most preferably silicon nitride. The dielectric layer 30 preferably comprises silicon oxide. Alternatively, the dielectric layer 30 could comprise silicon nitride or silicon oxynitride. In a further alternative, a more complex structure could be used with a polysilicon-air-polysilicon moveable upper mirror to increase the finesse of the device.

As will be appreciated by the skilled reader, the above-mentioned architecture may be fabricated by employing oxide layers which have different relative etch rates during the removal of the sacrificial layer, in this case phosphorous doped deposited silicon oxide. For example, thermal silicon oxide etches much more slowly in hydrofluoric acid than deposited doped oxide layers by a factor of between 5 and 100. However, an improved fabrication route is to avoid having exposed silicon oxide layers during a release etch.

The foregoing embodiments shown in FIGS. 3a and 3b utilise silicon dioxide as the dielectric within layer 30 and silicon oxide, silicon oxy-nitride or silicon nitride as the dielectric within layer 28, however the skilled person will be aware that other dielectric materials may be chosen to give good performance.

Using a dielectric layer 28 in FIG. 3b confers an addition benefit by providing electrical isolation between the polysilicon micro-mirror (used as the upper electrode in the device) and the lower polysilicon layer 26 (the lower electrode within the device). This configuration facilitates fabrication of an array of optical modulators 2 (where the fixed polysilicon layer is divided into a plurality of separate electrodes) since the silicon nitride layer protects the underlying silicon oxide layer from being etched away during the process to realise the air gap within the modulator.

Similarly, other structural layers/substrates may be used with appropriate optical/mechanical material properties, e.g. polysilicon-germanium, germanium, single crystal silicon etc.

An anti-reflective coating (ARC), such as SiO or $Ta_2O_5$/$SiO_2$, is typically added on the back of the silicon substrate 13 to optimise throughput and reduce the likelihood of spurious etalon effects.

To achieve good closed-state performance, a narrow air gap is required (e.g. 30-100 nm) that is challenging without the use of additional stand-off dimples 22 to prevent large area contacts. One alternative to use the blanket insulating dielectric layer 28 over the polysilicon electrode (with appropriate optical design) to allow touching and define the stand-off. The design is optimized to ensure the moveable micromirror overcomes stiction forces and returns to its equilibrium position.

The MOEMS optical modulator according to the present invention enables operation in the SWIR, MWIR, LWIR and some parts of the visible spectrum in transmission by adjusting the gap of the optical cavity.

Optionally, the device is useable in reflection in other optical bands (e.g. visible) provided sufficient travel is allowed (defined by the gap). Optionally, a thin upper reflective coating is used to improve performance.

Digital operation of the optical modulator is sufficient, in which case the micro-mirror is positioned either in its upper equilibrium position, or in its lower position in close proximity to the lower fixed electrode. The upper equilibrium position and the lower position shall include those positions adopted by the mirror with a reference voltage $V_{ref}$ applied to the modulator. The modulator is preferably used in transmission rather than reflection to improve system design. When used as a transmissive modulator, the optical modulator substantially blocks transmission of electromagnetic radiation there-through when the micro-mirror is positioned in its upper equilibrium position and substantially transmits electromagnetic radiation there-through when the micro-mirror is positioned in its lower position in close proximity to the substrate.

The present MOEMS modulator is particularly applicable to MWIR and SWIR imaging applications where other conventional modulator solutions cannot be applied for reasons of performance (e.g. LCD) or cost (e.g. multi-quantum well devices). Moreover, since the modulator may be fabricated exclusively from silicon, thermal bi-material effects are reduced or eliminated, and hence the behaviour of the modulator is largely unaffected by operational temperature (e.g. ranges in excess of −40° C. to +70° C. are readily accessible). This means that is suitable for cooling so that the micro-mirror does not add noise to an image. Accordingly, the modulator may be advantageously employed in IR imaging applications and adaptive coded aperture imaging applications (ACIA).

Figure 4A:
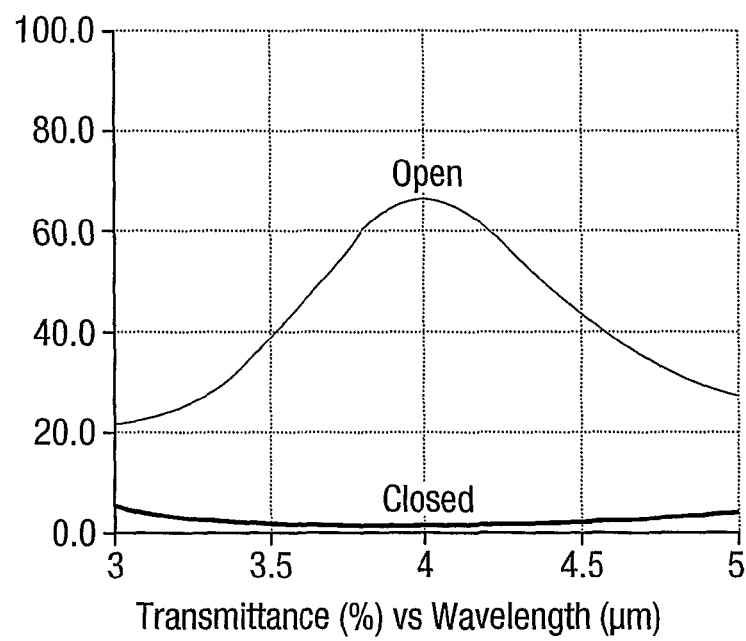
FIGS. 4a to 4c show typical performance characteristic for the optical modulator of FIG. 3a. Specifically.
Figure 4B:
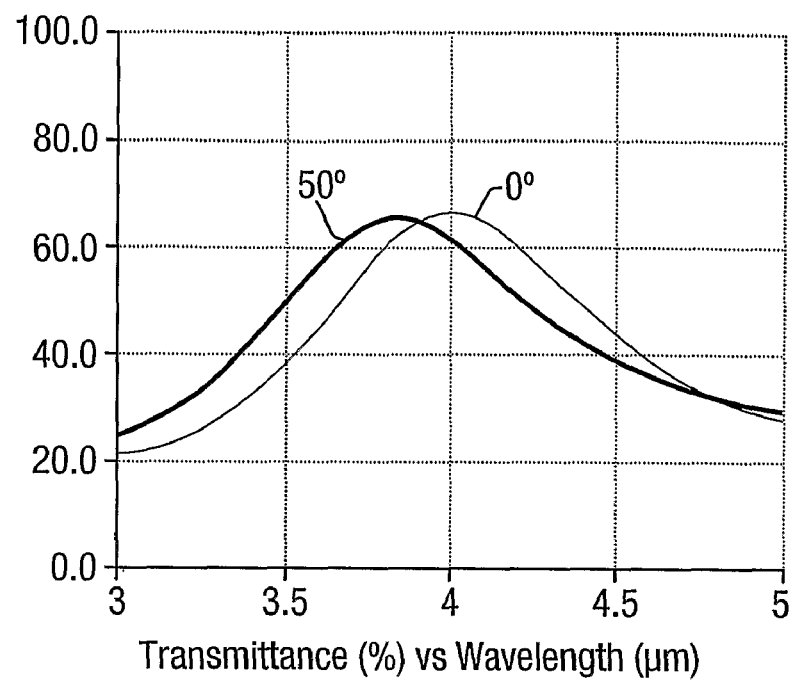
Figure 4C:
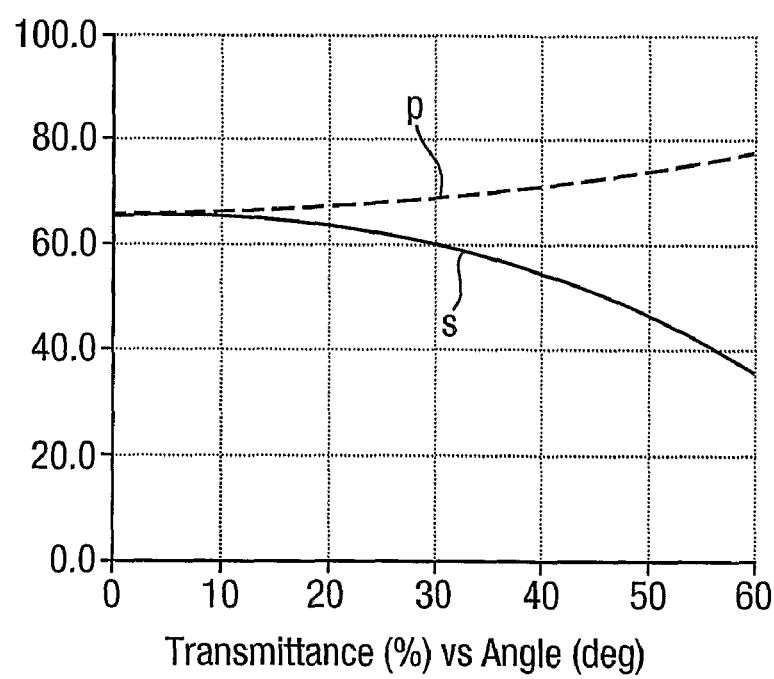

FIGS. 4a to 4c show typical performance characteristic for the tuneable cavity of FIG. 3b. Specifically, FIG. 4a shows transmittance in the MWIR waveband for the optical modulator when the micro-mirror is in its upper equilibrium position and in its lower position at normal incidence. FIG. 4b shows transmittance against MWIR waveband for the optical modulator when the micro-mirror is in its upper equilibrium position and in its lower position for incident angles of 0 degree and 50 degrees. FIG. 4c shows transmittance against angle of incidence by polarisation. In practice, incident angles in the range 15 degrees to 20 degrees may be used to minimise angular effects. In situations involving modulation of radiation from the atmosphere, it is beneficial to arrange transmission peaks to coincide with atmospheric transmission windows.

The dimensions of the optical stacks within the etalon may be optimised across the spectral and angular range to maximise contrast ratio—moving away slightly from conventional half/quarter wave optical stacks for a single wavelength device.

Figure 5A:
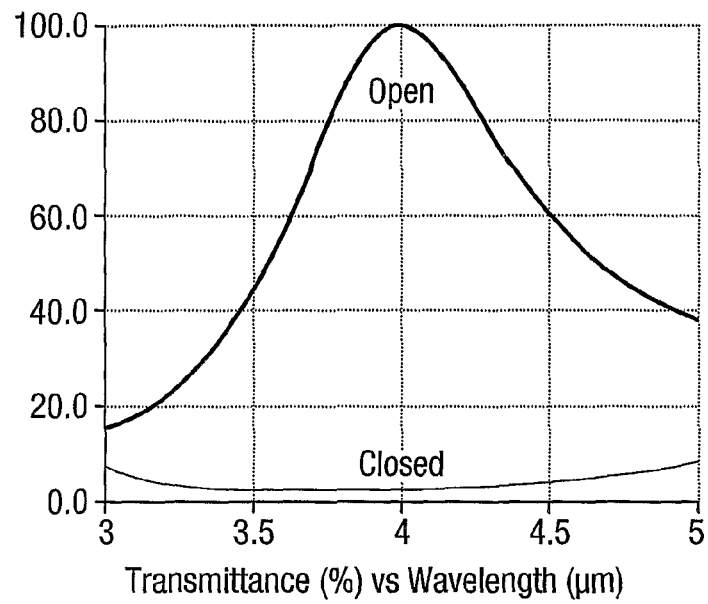
FIG. 5a shows a typical performance characteristic for the optical modulator of FIG. 3b optimised for maximum transmission in an optically open state in the 3.5 to 4.5 µm waveband.

FIG. 5a shows a typical performance characteristic for the tuneable cavity of FIG. 3b optimised for maximum transmission in an optically open state in the 3.5 μm to 4.5 μm waveband using the following layer sequence:
polysilicon micro mirror-air-silicon nitride-polysilicon-silicon dioxide-silicon substrate.

In this particular embodiment, the two states of the optical modulator (optically open—substantially transmissive/optically closed—optically non-transmissive) are achieved by moving the micro-mirror so as to adjust the air gap in the modulator. Standard positions would be ~1 μm and ~50 nm.

For specific imaging applications, e.g. adapted coded aperture imaging (ACAI), it is desirable to produce a two-dimensional array of MOEMS optical modulators wherein each optical modulator is individually addressable. This enables individual optical modulators within the array (also referred to hereinafter as picture elements or pixels) to be set in the optically closed or optically open position (reflect "0" or transmit "1"). For example, see FIG. 5b which shows a schematic representation of an adaptive coded aperture imaging (ACAI) system as described in our co-pending UK patent application GB 0510470 the content of which is hereby incorporated by reference thereto, including a two-dimensional array of MOEMS optical modulators according to the present invention.

Figure 1B:
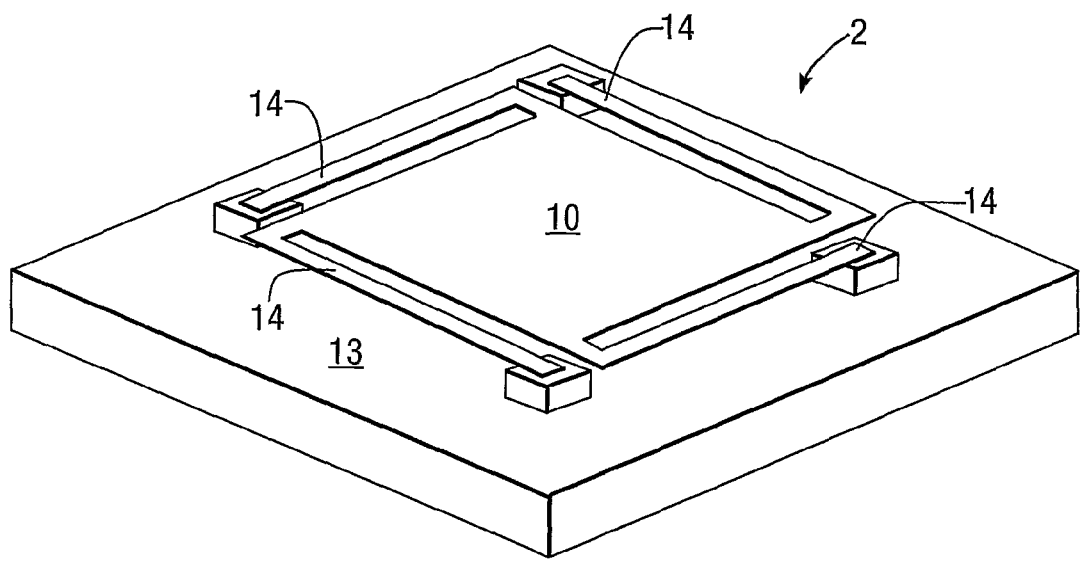
FIG. 1b shows a schematic perspective representation of an alternative MOEMS optical modulator having four support springs.
Figure 2:
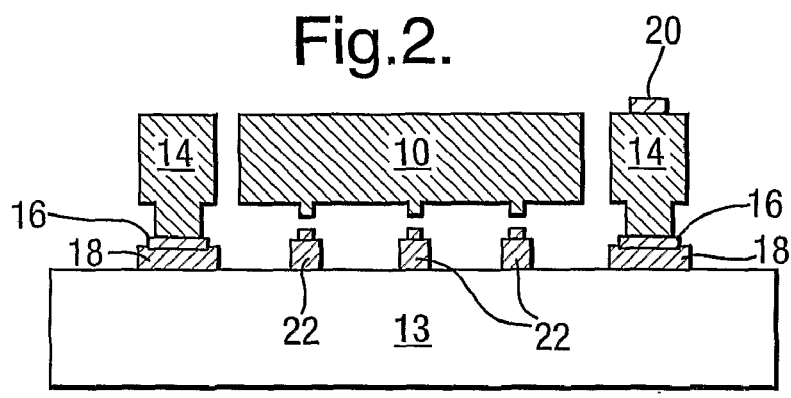
FIG. 2 shows cross-sectional view of a MOEMS optical modulator according to one embodiment of the present invention.

Hence, according to another embodiment of the present invention, a spatial optical modulator comprises a two dimensional array of optical modulators of FIGS. 1 to 3 addressable using a passive matrix row/column addressing scheme without the need for sub-pixel control electronics that would reduce fill factor unacceptably in a transmissive device. A critical aspect for the transmissive architecture is that the lower electrode is transparent and part of the optical design. A key benefit is that this embodiment of the invention enables a MEMS-only chip to be addressed using an off-chip drivers and means an integrated MEMS process is not necessary. This approach enables separate optimisation of the MEMS architecture and the pixel control electronics, reduces costs and provides a two-dimensional array which is scaleable to any size.

Passive matrix addressing of the two dimensional array is achieved in this embodiment of the invention by making the constituent optical modulators bistable using appropriate voltages.

In order to achieve this bistable characteristic, the micromirrors are arranged such that when the voltage applied to the optical modulator exceeds a certain value, the micro-mirror will snap down from the equilibrium position to the 'pull in' (or 'latch down') position. Non-linear effects in MOEMS optical modulators have hitherto been considered to be detrimental to the operation of the device and efforts have been made to eliminate such effects, for example see patent U.S. Pat. No. 5,838,484 which describes a MOEMS optical modulator with linear operating characteristic.

Accordingly, in the present invention each optical modulator 2 within the array is arranged so that the micro-mirror 10 therein will only latch down (pull in) when the applied potential difference across a pair of electrodes exceeds a threshold voltage ($V_{pi}$), in which condition the electrostatic attraction force is greater than the mechanical restoring force provided by the supporting springs 14. The optical modulator exhibits hysteresis so that the pull off voltage ($V_{po}$) is significantly lower than the pull in voltage. The degree of hysteresis may be tailored by appropriate design.

Figure 6:
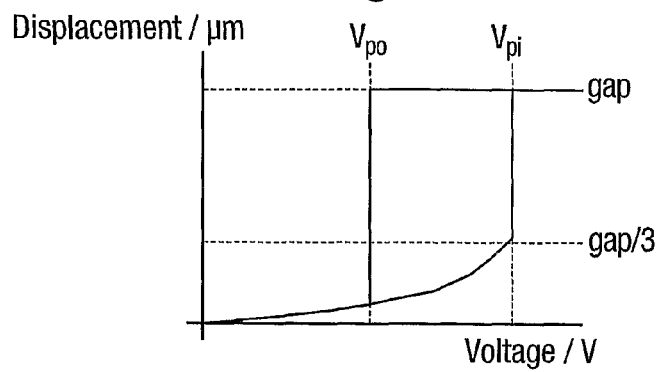
FIG. 6 illustrates the typical latching characteristic (hysteresis curve) for a MOEMS modulator according to the present invention.

In order to enable passive matrix addressing, the pull off (or release) voltage is arranged to be significantly lower (e.g. a factor of 2) than the pull in voltage. See for example FIG. 6 which shows schematically the hysteresis characteristic of one of the optical modulators within the array of the present embodiment.

Figure 7A:
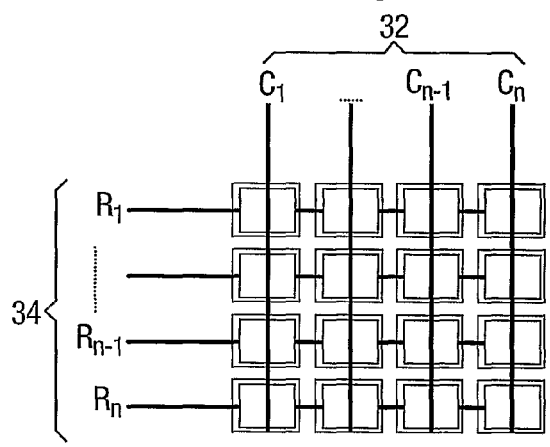
FIG. 7a shows schematic representation of a spatial optical modulator according to one embodiment of the invention having an array of pixels, each pixel individually addressable using a plurality of row and column address lines.
Figure 7B:
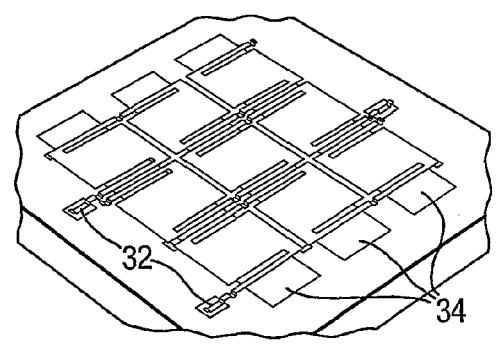
FIG. 7b shows a schematic perspective view of the spatial optical modulator having an array of 30 µm pitch pixels incorporating a buried electrode for row addressing and an electrode disposed on the micro-mirrors for column addressing.

In the present embodiment, the two dimensional array of optical modulators are arranged in a matrix between a plurality of column address electrodes 32, and a plurality of underlying row address electrodes 34, see FIG. 7. The upper column address electrodes 32 comprise the moveable micromirrors 10 within the optical modulators whereas the row address electrodes 34 comprise the fixed electrode plate 26 in each optical modulator and accessed via the edge, FIG. 7b refers.

Figure 7C:
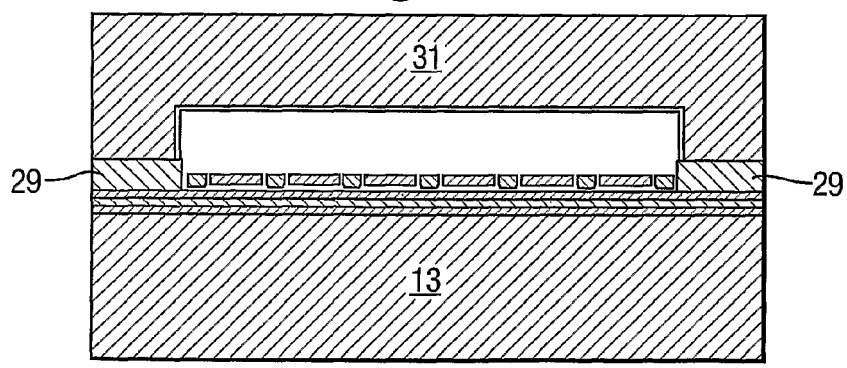
FIG. 7c shows a schematic cross-sectional representation of another embodiment of the invention comprising an encapsulated two dimensional array of optical modulators.

FIG. 7c shows a schematic cross-sectional representation of another embodiment of the invention comprising an encapsulated two dimensional array of optical modulators. Here, the optical modulator array is enclosed by a cap 31 attached using a wafer/chip scale encapsulation technique to the substrate 13 by a bond layer 29. In FIG. 7c, the cap is has a rebate formed therein. Alternatively a planer cap may be used if the thickness of the bond layer 29 is increased accordingly. Encapsulation in this manner enables the pressure within a sealed device to be controlled, thereby allowing the mechanical damping of the micro-mirrors to be controlled. This technique simplifies processing as devices are released wafer scale, bonded and sawn—avoiding debris issues and simplifying handling during packaging/integration into system. The cap 31 is provided with appropriate antireflection (AR) coatings and an appropriate spacing to the moveable mirror (e.g. >coherence length of light in application to avoid unwanted etalon effects). This spacing may be achieved by a rebate in the cap (as shown in the figure) and/or a bond spacer between the modulator wafer and the cap wafer. It is possible to actively use the gap between upper cap 31 and moveable mirror 10 in some way to further tune optical performance and exploit etalon effects with small gap.

Through wafer vias could also be incorporated into the substrate or cap (or even the electronic chips) to enable direct mounting of the electronic driver chips without flipping.

Optionally, the cap may be shaped to provide an element or elements having an optical functionality or optical power, for example the cap may have a lensing function.

In the present arrangement, the voltage applied to a given optical modulator within the array is the sum of the voltage applied to the moveable micro mirror (the column voltage) and the voltage applied to the fixed electrode (row voltage). This configuration enables each optical modulator or pixel within the array to be set individually in a row/column address scheme.

An addressing scheme according to one embodiment of the invention is now described which enables each pixel to be set and reset individually in a row/column addressing scheme (the whole array does not need to be reset to unlatch a pixel).

Those skilled in the art will appreciate that there are other ways of changing the column/row voltages to achieve the same functionality of moving the net potential difference applied to each pixel to fall within the hysterisis zone (hold), below the pull off voltage (reset) or above the pull in voltage (set) as described in detail herein. For example, during the reset function, the voltage of the column containing mirrors to be reset needs to be lower than that of the other columns such that the sum of the column voltage and the row voltage falls below the pull-off voltage. This may be achieved by reducing the voltage of the column of interest below the reference voltage (such that $V_{ref}-V_{reset}>V_{po}$ for other columns) or by increasing the voltage of the other columns above the reference voltage by $V_{set2}$ such that their potential remains above the pull off voltage whilst the column of interest (at $V_{ref}$) in conjunction with the row voltage fall below the pull off threshold. Similarly, the row and column voltages could be interchanged such that rows would be sequentially addressed whilst all the columns are set in parallel.

The addressing scheme according to the present embodiment of the invention is based on electrostatic hysteresis (see FIG. 6) where $V_{pi}$ is the latch (pull in) voltage and $V_{po}$ is the release (pull off) voltage. With reference to the prior art, the addressing scheme of EP 1 341 025 resets the entire modulator array by removing the latch voltage. EP 1 341 025 also uses a separate latch electrode. This makes only changing small parts of the array, whilst leaving the remainder unaffected, difficult and is potentially inefficient (requiring higher addressing speeds to adapt the array pattern in a given time).

Figure 8:
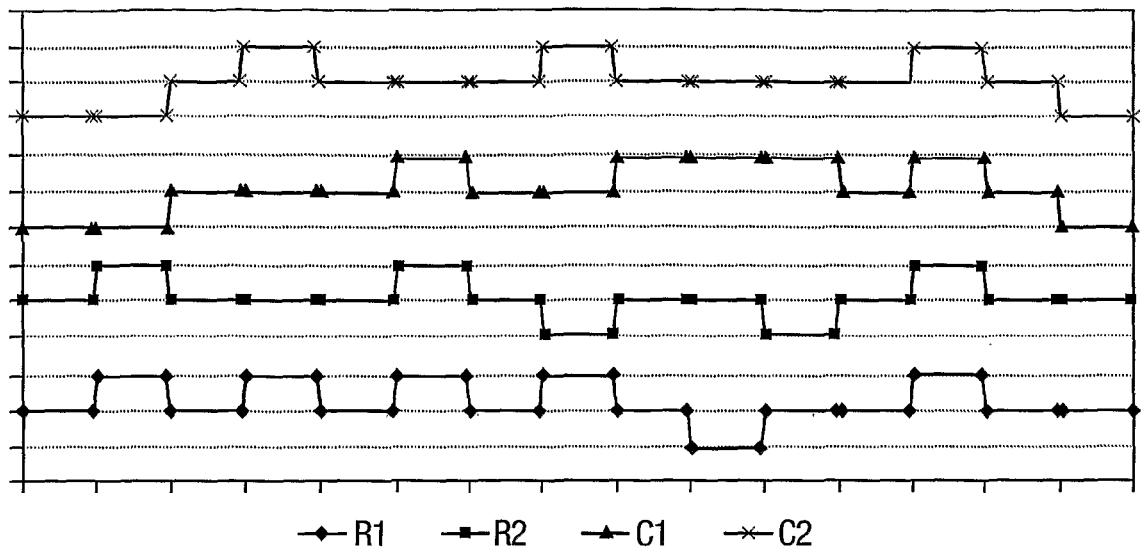
FIG. 8 illustrates example waveforms and corresponding pixel states typical of a matrix (row-column) addressing scheme according to another embodiment of the invention used to control the present MOEMS spatial optical modulator. The upper graph shows row and column voltage states while the lower graph denotes whether a pixel is in the latched (1) or released (0) state.
Figure 8:
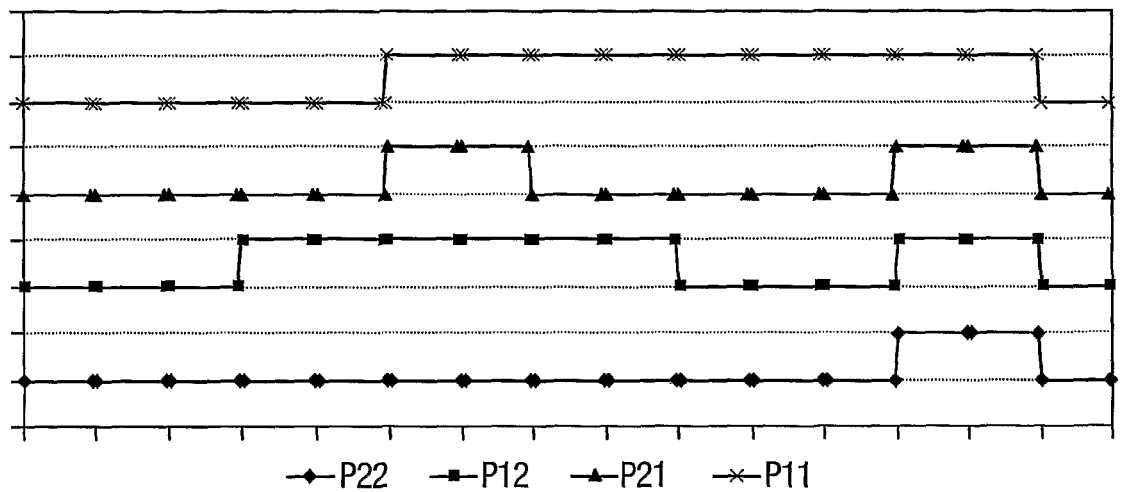

The addressing scheme described in this embodiment is best illustrated by the sequences shown in FIG. 8. Referring to FIG. 8, the row location is denoted by R row no., the column location by C column no. and pixel location by P row no., column no. For this example, let $V_{pi}=14V$, $V_{po}=10V$. The upper graph in FIG. 8 denotes row voltage states (e.g. up=−2V ($-V_{row-set}$), down=+2V ($V_{row-set}$), centre=0V) and column voltage states (e.g. up=13V ($V_{ref}+V_{set}$), centre=11V ($V_{ref}$) and down=0V). The drive voltage for a given pixel is given by ($V_{column}-V_{row}$). The lower graph in FIG. 8 denotes whether a given pixel is in latched (1) or released (0) state. The voltages used here are typical of a 25 μm micro-mirror with a 1.2 μm gap designed to modulate in the SWIR at 100 kbps.

The operations are performed by setting the appropriate combination of voltages as follows:

Set pixel—all columns at hold voltage reference, $V_{ref}$ except column with pixels to be set at $V_{ref}+V_{set}<V_{pi}$. Row voltages with pixels to be latched set to $-V_{row-set}$ so that potential difference, $V_{ref}+V_{set}+V_{row-set}>V_{pi}$ (other columns at $V_{ref}+V_{row-set}<V_{pi}$ so do not latch). $V_{row-set}$ removed from row and all columns returned to $V_{ref}$ to hold pixels in latched state.

Reset pixel—all columns at $V_{ref}+V_{set}$ ($<V_{pi}$) except column with pixels to be reset (released) at $V_{ref}$. Row voltages with pixels to be released set to $+V_{reset}$ so potential difference across pixels is $V_{ref}-V_{reset}<V_{po}$ (other columns at $V_{ref}+V_{set}-V_{reset}>V_{po}$ so if latched remain so). $V_{reset}$ removed from rows and all columns returned to $V_{ref}$ to hold desired pixels in latched state.

Reset/Set all—All columns to 0V to reset all. All columns to $V_{ref}+V_{set}$ and all rows to $V_{row-set}$ to set all.

A complete column may be addressed in parallel in this way (i.e. all the row voltages are set to change the entire column when the column voltage is set. Columns are addressed sequentially.

The terms row and column used above are not limiting but may be interchanged without affecting the addressing scheme.

In principle, using this approach the spatial optical modulator array is scaleable to any size. For an imaging scenario, the individual pixel micromirror pitch is likely to fall in the range 15-100 μm. When used in an imaging application, preferably the pitch matches the pitch of pixels in the imaging array of the detector. The array must comprise independent columns and, in practice, the size will be limited by resistance/capacitance (RC) time constant considerations. This is mitigated by only switching one column at any time. The resistance of individual pixels will be dominated by the spring width and length—for example, in 0.5 μm thick polysilicon with a 2 μm spring, the pixel array resistance is of the order of 500KΩ/cm whilst the capacitance of the array is of the order of 50 pF/cm (for a 100 μm pixel plate) giving an RC constant of 2.5 μs/cm. A stepper field size as used in lithography is typically of the order of 2×2 cm and so this would be a practical size limit for a tile to build up larger arrays whilst maintaining good control and yield. However, employing a buried layer or a second layer of lower resistance polysilicon interconnect above the spring could reduce the resistance significantly (>10×). Alternatively or additionally, a thin metal layer could reduce track resistance by 2-3 orders of magnitude if speed/resistive voltage drop is an issue. For example, this could be deposited when the device is partially released using a combination of shadow masking from the structure itself and/or lift-off to protect areas where no Au is required (e.g. transmissive region of pixel). Where the modulator comprises additional polysilicon and metal conductor layers, said layers may be arranged to form an optically blocking layer in parts of device to maintain optimal contrast. This is particularly beneficial in low fill factor devices.

For the electrode layer, the fixed polysilicon acts as the electrical conduit. This is significantly wider than the spring in the moveable array layer and so less likely to limit performance. To reduce its resistance further, the electrode array could be connected to the substrate with implanted tracks periodically using vias. The tracks in the substrate are isolated using reverse biased pn diodes as a result of the implants. For the most aggressive resistance control, a silicide or metal tracks could also be defined on the substrate but care would be needed that it did not interfere with the optical path.

A metal-nitride process is an interesting alternative in this circumstance as both the electrode and moveable micro mirror layer would contain low resistance metal tracking. The drive voltage would likely be higher due to the need to fabricate the majority of the micro mirror as PECVD nitride only to allow transmission (unless an IR transmissive metallization were employed). In practice, metallization may applied to the top and the bottom of the PECVD nitride layer so as to reduce thermal bi-material effects and to reduce the drive gap (thereby reducing the drive voltage).

Optionally, a micro-lens array may be used in conjunction with the spatial optical modulator of the present invention to maintain the efficiency of the optical modulator in circumstances where the fill factor of modulators within the spatial optical modulator array is reduced.

According to further embodiment of the invention a process of optical apodization can be used within the present spatial optical modulator to reduce edge effects and hence diffraction. The pixel can be apodized by suitably profiling one of the cavity mirror elements within the optical modulators of the array. For example, the mirror may be imparted with a monotonically increasing profile, a stepped profile etc designed so as to reduce the optical transmission of the individual Fabry-Perot elements. Most practically, this would be constrained to near the periphery of the micro mirror. Alternatively, or in addition, to achieve apodization, metallization is added to the edge(s) of the cavity mirror. The metallization may comprise a layer or layers of metal (e.g. gold). The thickness of the metallic layer may be graduated. In addition, or alternatively, the metallization is applied using a grey scale pattern (half-tone pattern) etc. to vary the optical density of the metallic layer.

Figure 9A:
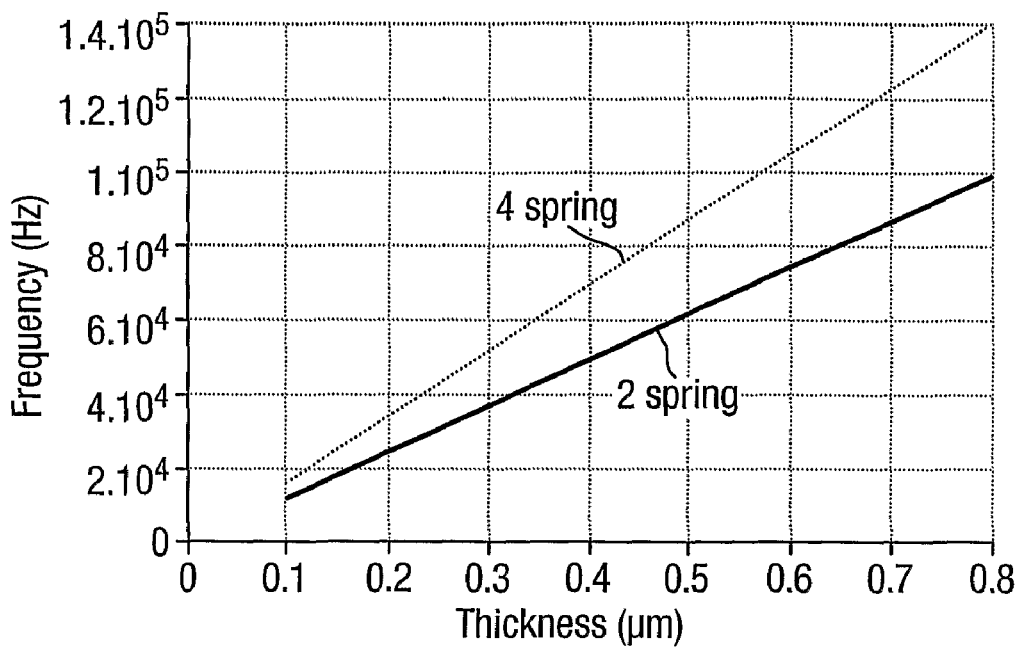
FIG. 9a shows a plot of predicted resonant frequency vs. pixel thickness.
Figure 9B:
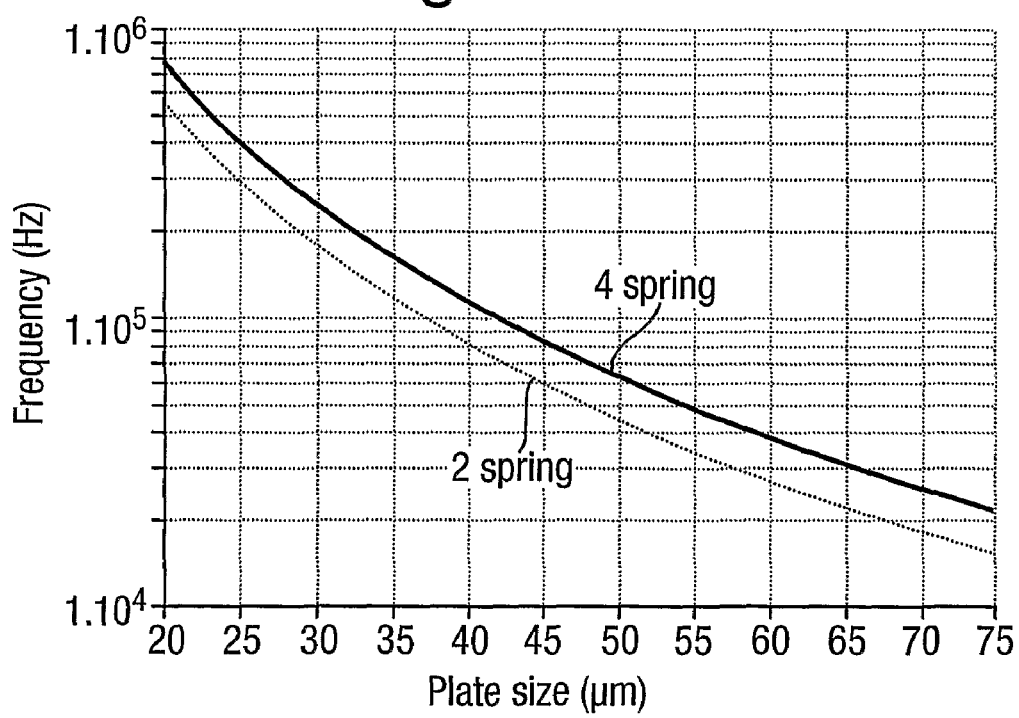
FIG. 9b shows a plot of predicted resonant frequency vs. plate size.
Figure 9C:
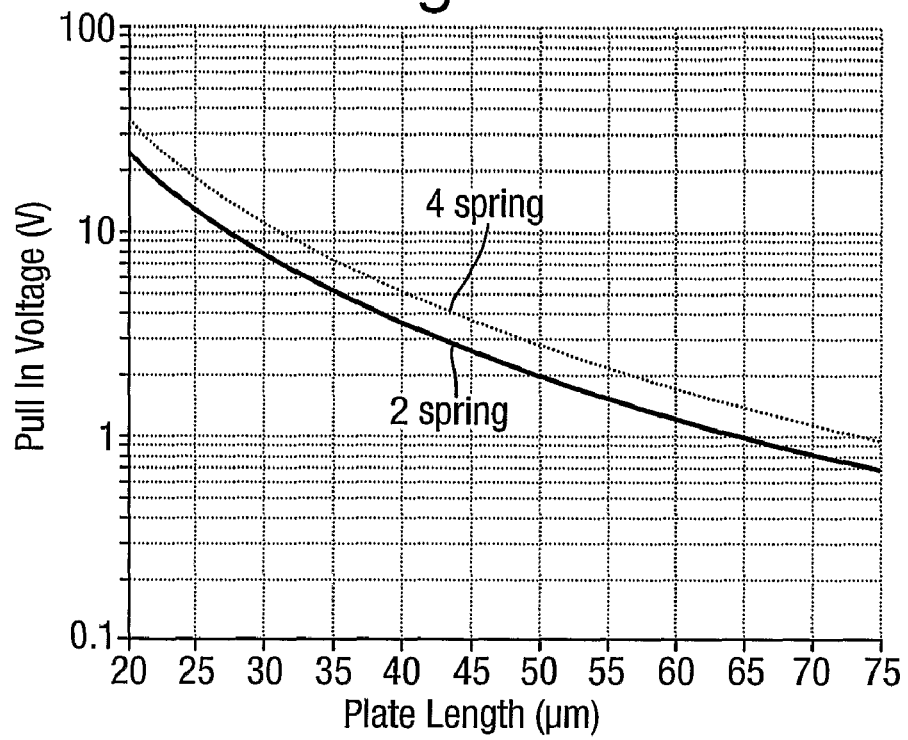
FIG. 9c shows a plot of predicted drive voltage vs. plate size.
Figure 9D:
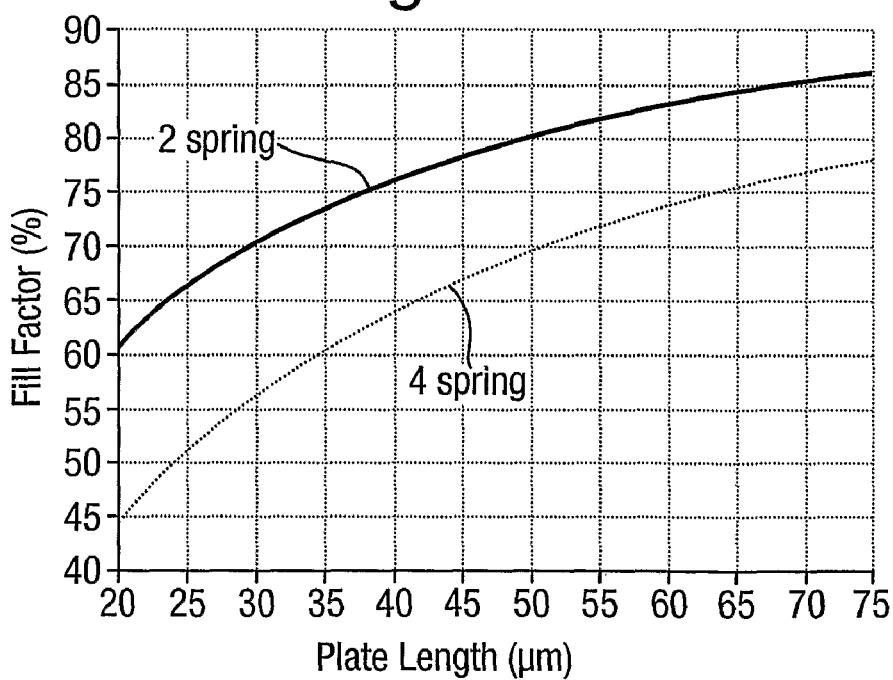
FIG. 9d shows a plot of predicted fill factor vs. plate size.

In terms of MEMS design, the main features of interest are the speed, voltage (power) and micro mirror size. With reference to the figures, FIG. 9a shows a plot of predicted resonant frequency vs. pixel thickness, FIG. 9b shows a plot of predicted resonant frequency vs. plate size, FIG. 9c shows a plot of predicted drive voltage vs. plate size, and FIG. 9d shows a plot of predicted fill factor vs. plate size. FIGS. 9a to 9d highlighting the following trends; larger pixels reduce the drive voltage and increase the fill factor whilst reducing speed, the four spring design is faster but requires a larger drive voltage and has a lower fill factor, thinner pixels reduce the drive voltage and the speed.

Figure 10:
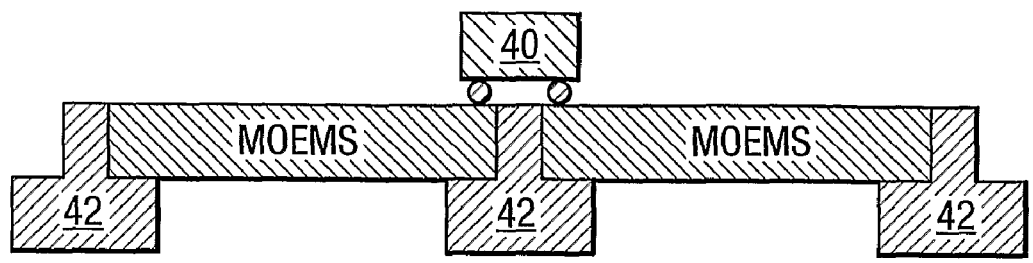
FIG. 10 shows a schematic illustration of a large MOEMS spatial optical modulator array comprising multiple MOEMS spatial optical modulator chips linked by electronics chips (driver ASIC) using direct chip attach technology (e.g. ball grid array/flip-chip). The illustration is shown in cross-section.

It will be appreciated by the skilled person that large areas can be tiled from smaller MOEMS spatial optical modulator arrays according to the present invention. In another embodiment of the invention hybrid integration employing direct chip attach techniques is used to flip and bond a thinned driver electronics chip 40 onto two sides of a MEOMS spatial optical modulator array chip for column and row addressing respectively (e.g. using fine geometry solder bump technology). When scaled to a two dimensional array of tiles (modulator chips), this results in a MEMS chip surrounded on all 4 sides by driver chips. A dummy chip may be used for the blank edges around the periphery of the tile array. The driver chips may alternatively contain electronics for two neighbouring chips, requiring a driver chip on a 4 edges of every tile. Using this technique, two MOEMS modulator chips are attached by each electronics chip as shown in FIG. 10.

Building large arrays out of small tiles is the most effective way to reduce cost as yield deceases with chip area. It also controls the number of columns and rows each driver chip needs to address (and hence RC/resistive loss and power/current considerations). For example in a 2×2 cm chip, if the pixel pitch were 20 µm, there would be 1000 rows and 1000 columns. This requires 10 bit addressing. Such as chip could be realised in a 0.35 µm mixed CMOS technology if the drive voltage were below 3.3V or 0.8 µm mixed CMOS technology if the drive voltage were below 5V. Higher drive voltages would require a high voltage (20-50V) process variant and/or larger geometry process, resulting in a highly specialised design of drive electronics. Transistor sizes in high voltage processes are also larger, meaning that this approach may cease to be viable using simple layouts and architectures. Configurations using combinations of driver chips operating at different drive voltages are also feasible. For example in a column and row addressing scheme, the column address driver may comprise a standard CMOS driver chip, whereas the row address driver may comprise a high voltage driver chip. In this example, the high voltage driver chip is capable of operating up to 40v for small pixel pitches.

Using such a tiling arrangement, it is also possible to realise non-flat shapes, such as a geodesic dome to give added rigidity. FIG. 10 also illustrates an optional support frame which has elements 42 arranged to increase the rigidity of the tiled array. The support frame may advantageously be thermally conductive (e.g. metallic) and may be used to control the temperature of the tiled array. For example, the whole array may be cooled by removing heat from the edges via the support frame. Optionally, the support frame comprises a hollow cross-section through which a cooling fluid is passed. Alternatively, the data and/or power connections may be routed through or on the support frame to the tiled plurality of MOEMS arrays.

A 50×50 array of 2 cm chips may be further multiplexed to enable/disable a particular chip for setting and give a 1×1 m mask. If using a single element, this would require 16 bit addressing on a 2.5 Gpixel array.

The speed to update a tiled large area array is a major design consideration. The voltage drives a capacitive load and so the electrical speed is limited by RC considerations. For a typical design, the RC time constant is of the order of 2.5 µs/cm length—compatible with a 10 µs/pixel switching speed for a 2×2 cm chip. In the above configuration, this is limited by the resistance of the polysilicon in the column path and to a lesser extent the rows. Both could be reduced by adding a more conductive path in parallel with a slight addition in process complexity as previously described. The mechanical response is determined by the resonant frequency of the device and the damping (pressure). The frequency is dependent on the thickness of the moving layer, the spring design and the pitch. With appropriate design, it is predicted to be of the order of 1-10 µs. With potentially a 1000×1000 array (20 µm pitch on a 2 cm chip), an array update time of below 10 ms results using the addressing scheme proposed herein wherein pixels within a whole column are set in parallel. By using tiles of this size, and driving/addressing all modulator tiles in parallel, an array of any size may be set at the same speed as an individual tile.

The drive voltage depends on the pixel area, spring geometry and gap. For an optical design with a 35 µm pixel, it is of the order of 5V and it would be capable of responding at up to 200 kHz. Power consumption is a function of the voltage in combination with the capacitance, number and frequency of pixels changing states and the efficiency of any charge recovery schemes employed.

The MOEMS optical modulator according to any of the foregoing embodiments of the present invention is fabricated by successive depositing of material layers on a silicon substrate. Alternatively the device is manufactured using the device layer of a SOI wafer that is patterned and transferred to the MEMS wafer in place of the polysilicon structural layer. This could be advantageous as high temperature processing steps would not be required to control the stress in the polysilicon layer and enable conventional CMOS electronics on the substrate.

It is possible to post-process the present MOEMS optical modulator on a substrate containing CMOS using a low temperature technology, such as polysilicon-germanium micromachining (e.g. IMEC or UC Berkeley) or a metal-nitride process (e.g. QinetiQ). The latter would use a PECVD nitride film as the main optical/structural element with low resistance metal tracking as previously described. It is also possible to incorporate the standard polysilicon process into a modified large geometry (2-3 µm) CMOS or BiCMOS process flow with slightly degraded transistor characteristics.

Figure 5B:
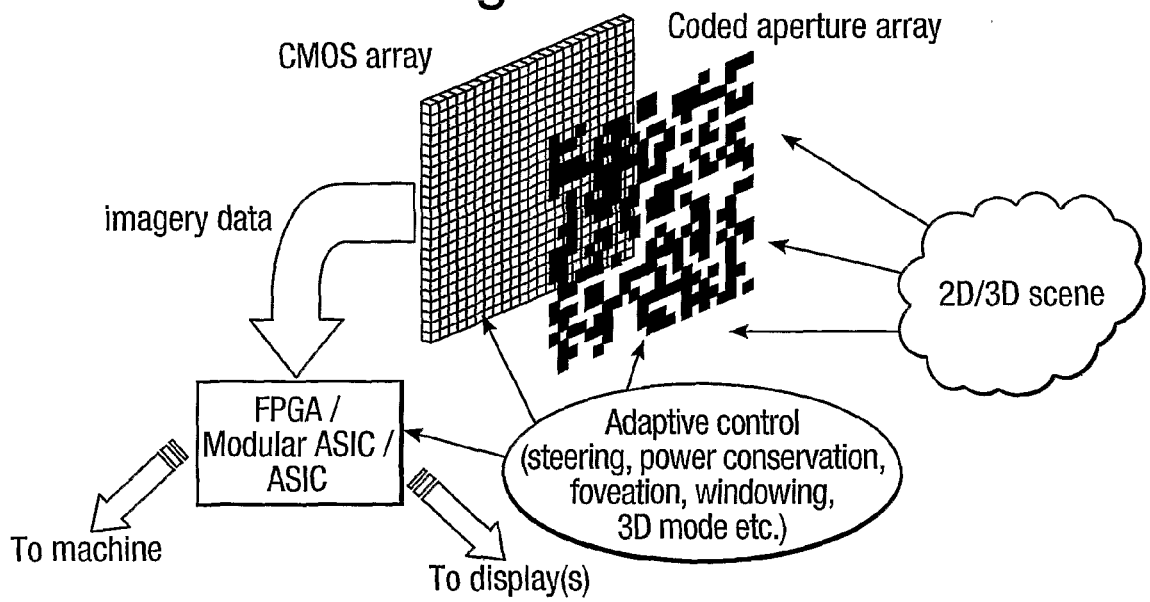
FIG. 5b shows a schematic representation of an adaptive coded aperture imaging (ACAI) system as described in our co-pending UK patent application GB 0510470 the content of which is hereby incorporated by reference thereto, including a two-dimensional array of MOEMS optical modulators according to the present invention.

One particular application of the MOEMS spatial optical modulator array of the present invention is as a reconfigurable mask within an adaptive coded aperture imaging (ACAI) system. Referring to FIG. 5b, the reconfigurable mask comprising at least one of the present MOEMS spatial optical modulator arrays is used in front of a two-dimensional detector array and arranged to modulate the amplitude and/or phase of electromagnetic radiation incident thereon from a scene. The mask provides a plurality of individually addressable apertures or pin-holes. Typically the pitch of apertures within the mask is ~15-50 µm. In practice, a plurality of optical modulators may be grouped together to act as a larger modulator having a greater effective aperture. For example, four individual optical modulators each having a 50 µm$^2$ sub aperture may be grouped to form a single optical modulator having a 200 µm$^2$ effective aperture.

Alternative applications of a MOEMS spatial optical modulator of the present invention include, but are not limited to, in-use calibration of infrared detector arrays, electro-optical protection and scanning detector applications.

Calibration of infrared detector arrays is an important application of the present MOEMS spatial optical modulator since, due to variations in the manufacturing process, the output signal from an infrared detector varies considerably from detector to detector. This is true even in a two-dimensional array of detectors made at the same time. Individual elements on a two-dimensional array of infrared detectors are normally accessed by bump bonding the array on to a silicon readout circuit which can act as a multiplexer. Variations in the properties of the silicon transistors add to the variation in the outputs and in general make the output vary non-linearly with input flux.

It is therefore essential to calibrate the output from each pixel in an array as a function of flux. Due to the non-linear nature of the variation, it is necessary to do this calibration at a significant number of fluxes if high quality imaging is needed over a range of scene temperatures (such as viewing sky and ground).

The conventional solution is to use a thermo-electrically controlled calibration black-body plate and measure the output as a function of the plate temperature. The disadvantage of this technique is that allowing for settling time at each temperature it can take up to seven minutes to complete this procedure. Ideally a source is required which can produce a stable range of fluxes rapidly. As well as reducing the time-to-operation, this will enable more frequent calibration cycles. This will help reduce drift in the calibration settings due to effects such as variation in the array temperature. Furthermore, since silicon and polysilicon have the same temperature coefficient of expansion, heating and cooling does not add additional stresses in the spatial optical modulator which may otherwise adversely effect performance.

A fast calibration source may be produced by combining a conventional fixed temperature black-body plate and a reconfigurable adaptive coded aperture (ACA) mask comprising a MOEMS spatial optical modulator according to the present invention. As before, the ACA mask consists of an array of openings in a mask plate which can be opened or closed to vary the flux falling on the detector. Ideally, the ACA mask would be cooled, however this may not be necessary if the switching goes from a transmissive to a reflective state.

Figure 11:
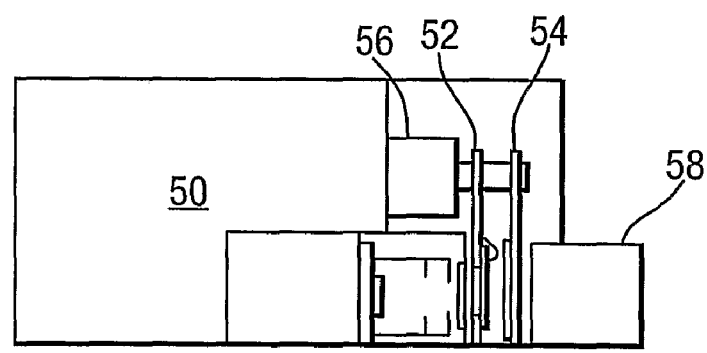
FIG. 11 shows a schematic illustration of an infrared camera using an adaptive coded aperture (ACA) based calibration source comprising a MOEMS spatial optical modulator according to the present invention.

A range of calibrated fluxes can be generated by varying the number of openings from fully closed to fully open. As switching of the mask can be done relatively quickly, it should be possible to get multipoint calibrations in a short time. A possible configuration of a camera using this system is shown in FIG. 11. The infrared camera system 50 of FIG. 11 employs an ACA mask 52 arranged on a paddle and a thermo-electrically (TE) controlled black body plate 54 arranged on a paddle. During calibration, the ACA mask 52 and the TE controlled plate are rotated by rotation means 56 into a position between the camera lens 58 and the two-dimensional infrared detector array. During calibration, the two-dimensional infrared detector array images the thermo-electrically (TE) controlled black body plate 54 rather than receiving infrared radiation from a scene outside the camera. For a conventional imaging system, the mask is not at an imaged position and hence the illumination of the focal plane will be uniform—however this can be improved by spreading out the openings uniformly on the ACA mask.

In an adaptive coded aperture imaging (ACAI) system as described above, an ACA mask is already included and hence the abovementioned calibration scheme can be implemented without additional cost. A particular application is in a lens-less adaptive coded aperture imaging (ACAI) system. In a lens-less ACAI imaging system, the flux falling on each detector is expected to be relatively uniform (due to averaging flux from all the openings) and good imaging will depend on accurate calibration over a relatively small range of flux. A range of fluxes around this value could again be generated by opening different patterns on the mask. A more complex scheme may be implemented which can calibrate out variations in the transmission of the individual openings on the mask.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived there from. In particular, with reference to the appended claims, features from dependent claims may be combined with those of the independent claims and features from respective independent claims may be combined in any appropriate manner and not merely in the specific combinations enumerated in the claims.

The invention claimed is:

1. A micro-opto-electro-mechanical systems (MOEMS) optical modulator having an optical resonator comprising an asymmetric Fabry-Perot etalon incorporating a mirror resiliently biased with respect to a substrate and moveable in relation thereto in response to a voltage applied there-between, wherein the optical modulator is adapted to modulate transmission of at least one of short wave infrared radiation (SWIR), medium wave infrared radiation (MWIR) and long wave infrared (LWIR).

2. An optical modulator according to claim 1 wherein the substrate is substantially transmissive to SWIR, MWIR and LWIR radiation.

3. An optical modulator according to claim 1 wherein the modulator is substantially transmissive to MWIR radiation in an optically open state and substantially non-transmissive to MWIR radiation in an optically closed state.

4. An optical modulator according to claim 3 having a maximum transmittance greater than 50% in the optically open state and a minimum transmittance of less than 5% in the optically closed state for MWIR radiation.

5. An optical modulator according to claim 1 having a multilayer stack comprising the following plurality of contiguous layers: silicon moveable mirror layer, air gap, silicon layer, a first dielectric layer, and a silicon layer.

6. An optical modulator according to claim 5 wherein the first dielectric layer comprises one of silicon dioxide, silicon oxynitride, and silicon nitride.

7. An optical modulator according to claim 1 having a multilayer stack comprising the following plurality of contiguous layers:
    silicon moveable mirror layer, air gap, a second dielectric layer, silicon layer, a first dielectric layer, and a silicon layer.

8. A optical modulator according to claim 7 wherein the second dielectric layer comprises one of silicon dioxide, silicon oxynitride, and silicon nitride.

9. An optical modulator according to claim 1 adapted to modulate reflection of visible radiation.

10. An optical modulator according to claim 1 wherein the mirror is moveable within the asymmetric Fabry-Perot etalon between a substantially stable first position distal to the substrate and a substantially stable second position proximate the substrate.

11. An optical modulator according to claim 10 wherein the mirror is adapted to respond to applied voltage to move non-linearly between the first and second positions.

12. An optical modulator according to claim 10 wherein the mirror is adapted to move from the first position upon application of a force thereto having a magnitude which exceeds a first threshold and is adapted to move from the second position upon reduction of the magnitude of the applied force below a second threshold, the two thresholds being arranged to be substantially different.

13. An optical modulator according to claim 12 wherein the force is an electrostatic force having a magnitude substantially proportional to the square of the applied voltage.

14. An optical modulator according to claim 12 wherein the mirror has a positional response which exhibits hysteresis.

15. An adaptive coded aperture imaging (ACAI) system comprising an aperture mask having at least one spatial optical modulator comprising a two-dimensional array of optical modulators according to claim 1, said at least one spatial optical modulator arranged so as to modulate electromagnetic radiation incident on a detector array.

16. An optical modulator according to claim 1 wherein said optical modulator is apodized.

17. An optical modulator according to claim 16 comprising a profiled mirror.

* * * * *